United States Patent
Maruyama et al.

(10) Patent No.: US 6,654,073 B1
(45) Date of Patent: Nov. 25, 2003

(54) LIQUID CRYSTAL DISPLAY HAVING STORAGE CAPACITANCE ELECTRODES AND METHOD OF FABRICATING THE SAME

(75) Inventors: Muneo Maruyama, Tokyo (JP); Takahiko Watanabe, Tokyo (JP); Hironori Kikkawa, Tokyo (JP); Yuji Yamamoto, Tokyo (JP); Mamoru Okamoto, Tokyo (JP); Michiaki Sakamoto, Tokyo (JP); Shinichi Nakata, Tokyo (JP); Masanobu Hidehira, Tokyo (JP); Yoshitaka Horie, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 236 days.

(21) Appl. No.: 09/650,616

(22) Filed: Aug. 30, 2000

(30) Foreign Application Priority Data

Sep. 1, 1999 (JP) .......................................... 11-247616

(51) Int. Cl.⁷ ............................................. G02F 1/1343
(52) U.S. Cl. ...................................... 349/38; 349/138
(58) Field of Search .............................. 349/138, 38, 39

(56) References Cited

U.S. PATENT DOCUMENTS

| | | | | |
|---|---|---|---|---|
| 5,859,683 A | * | 1/1999 | Tagusa et al. ............... | 349/138 |
| 5,943,107 A | * | 8/1999 | Kadota et al. ................. | 349/44 |
| 5,953,088 A | * | 9/1999 | Hanazawa et al. .......... | 349/110 |
| 6,097,452 A | * | 8/2000 | Shimada et al. ............... | 349/38 |
| 6,115,090 A | * | 9/2000 | Yamazaki ..................... | 349/42 |
| 6,243,146 B1 | * | 6/2001 | Rho et al. ...................... | 349/42 |
| 6,307,602 B1 | * | 10/2001 | Song ........................... | 349/38 |
| 6,313,898 B1 | * | 11/2001 | Numano et al. ............ | 349/129 |
| 6,411,346 B1 | * | 6/2002 | Numano et al. ............... | 349/39 |

FOREIGN PATENT DOCUMENTS

| | | | |
|---|---|---|---|
| JP | 04-044014 | 2/1992 | .......... G02F/1/136 |
| JP | 04-194823 | 7/1992 | .......... G02F/1/136 |
| JP | 9-152625 | 6/1997 | .......... G02F/1/136 |

* cited by examiner

Primary Examiner—Toan Ton
Assistant Examiner—Andrew Schechter
(74) Attorney, Agent, or Firm—Hayes Soloway P.C.

(57) ABSTRACT

Band-shaped data lines are arranged in parallel with each other so as to cross address lines via a gate insulating film formed over the address lines. An upper insulating film is formed over the data lines, and pixel electrodes are formed on the upper insulating film. Storage capacitance section includes common electrode and storage capacitance electrode. The common electrode is extended from the address line of adjacent pixel region. The storage capacitance electrode sandwiches the gate insulating film with the common electrode to store capacitance therebetween. The storage capacitance electrodes and the pixel electrodes are connected to each other via conductive through hole piercing through the upper insulating film. Besides, the storage capacitance electrode, source electrode of the thin film transistor section and a wiring connecting them are integrally formed of the same metal films.

12 Claims, 15 Drawing Sheets

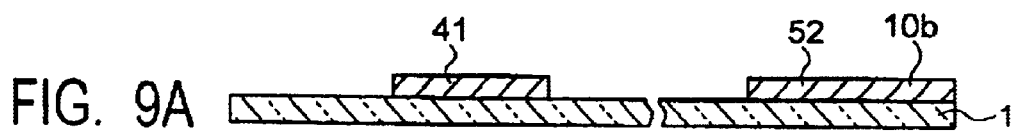
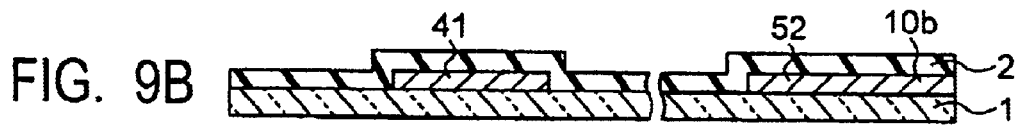
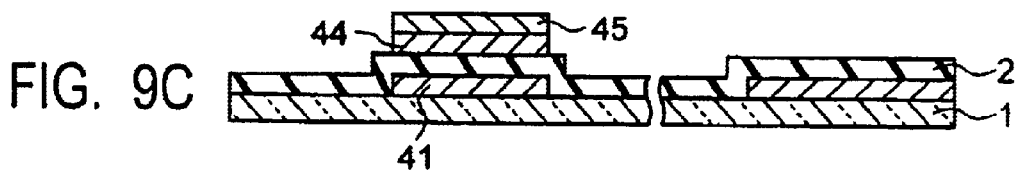
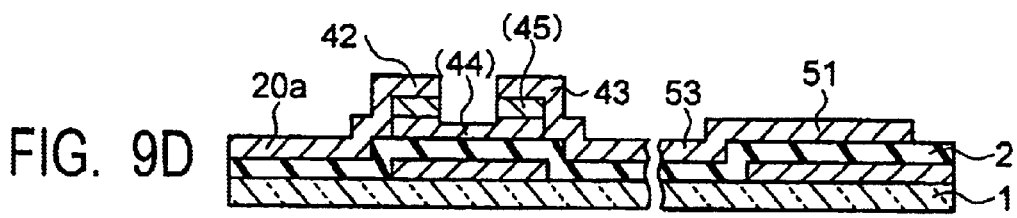
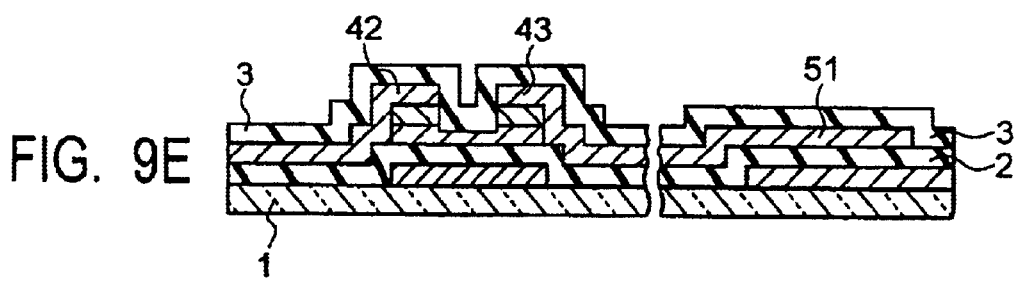
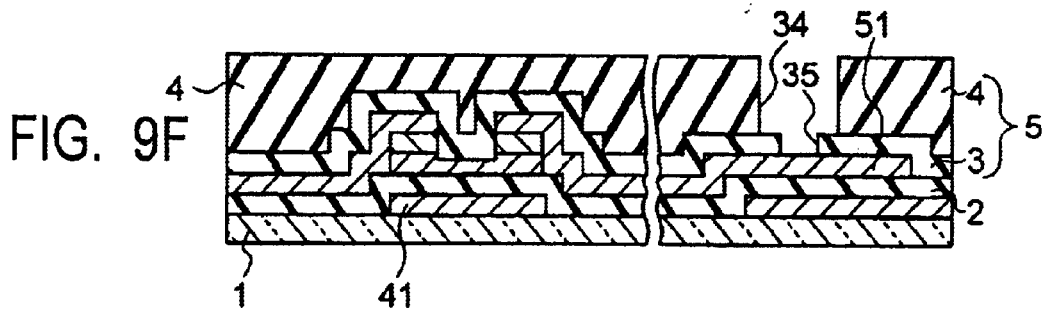
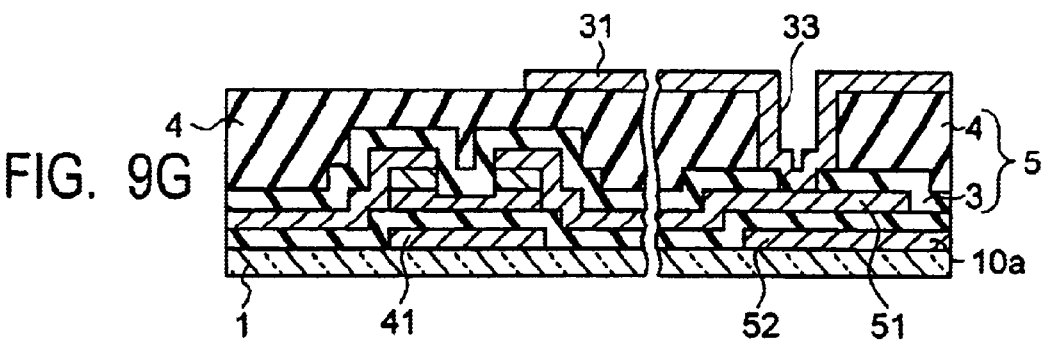

LIQUID CRYSTAL DISPLAY HAVING STORAGE CAPACITANCE ELECTRODES AND METHOD OF FABRICATING THE SAME

BACKGROUND OF THE INVENTION

1. Field of the Invention

The present invention relates to a thin film transistor (TFT) type liquid crystal display and a method of fabricating the same. In particular, the present invention relates to a high-resolution liquid crystal display which has an improved aperture ratio and high reliability as well as is simple in structure and capable of low-cost and high-yield fabrication, and a method of fabricating the same.

2. Description of the Related Art

An active matrix type liquid crystal display using thin film transistors (hereinafter, referred to as TFTs) as its switching elements comprises a TFT array substrate, a light shielding film (so-called black matrix), and a color filter substrate which are opposed to one another across liquid crystal. Pixel regions each having an independent TFT and a pixel electrode are arranged on the TFT array substrate in a matrix. On the color filter substrate are laminated a color layer and a transparent common electrode.

FIG. 1 is a circuit diagram showing the circuit configuration of a single pixel region in a conventional liquid crystal display. In FIG. 1, this liquid crystal display comprises a plurality of address lines 110a, 110b, ..., a plurality of address lines 120a, 120b, ..., a liquid crystal element 130, a TFT section 140, and a storage capacitance section 150. The address lines 110a, 110b, ... are formed on an insulative substrate. The data lines 120a, 120b, ... are formed thereon across a gate insulating film so as to cross the address lines 110a, 110b, .... The liquid crystal element 130 is formed in a pixel region P1 that is enclosed with the address lines 110a, 110b and the data lines 120a, 120b. The TFT section 140 drives the liquid crystal element 130. The storage capacitance section 150 stores capacitance in parallel with the liquid crystal element 130.

The address lines 110a, 110b, ... are driven by an address line driver (not shown), so that a signal for forming a scanning line on the screen of the liquid crystal display is transmitted to the TFT section 140 in the pixel region P1.

The data lines 120a, 120b, ... are driven by a data line driver (not shown), so as to transmit an image signal to the TFT section 140 in this pixel region P1.

The liquid crystal element 130 consists of a pixel electrode 131, liquid crystal 132, and a counter electrode 133. The pixel electrode 131 and the liquid crystal 132 spread throughout the pixel region P1. The counter electrode 133, opposed to the pixel electrode 131 across the liquid crystal 132, is common to the entire screen of the liquid crystal display. This counter electrode 133 is connected to a con potential COM. Both the pixel electrode 131 and the counter electrode 133 are formed of an ITO (indium-tin oxide) or other transparent conductive film.

The TFT section 140 consists of a gate 141 extended from the address line 110a, an electrode (hereinafter, referred to as drain electrode) 142 extended from the data line 120a, and an electrode (hereinafter, referred to as source electrode) 143 connected to the pixel electrode 131. The scanning line signal applied to the gate 141 selectively connects the drain electrode 142 and the source electrode 143 to each other so that the image signal supplied through the data line 120a is transmitted to the pixel electrode 131.

The storage capacitance section 150 is provided so that when the address line 110b becomes non-selected, a liquid crystal driving potential applied to the pixel electrode 131 at that moment is retained until a next scanning line signal is applied to the gate 141. This prevents the liquid crystal driving potential from leaking to drop through the TFT section 140 and the like and shifting the liquid crystal 132 into an inactive mode to cause a change in color density. In the example of FIG. 1, the storage capacitance section 150 is formed between the address line 110b of an adjacent pixel region P2 and the storage capacitance electrode 151 in this pixel region P1. While a scanning line signal is applied to the pixel region P1 the address line 110b in the adjacent pixel region P2 is non-selected, and is supplied with a constant potential of the order of −10 V from a driver IC (not shown). This makes it possible to use the address line 110b as a common electrode 152 in the storage capacitance section 150.

In some other examples of the liquid crystal display, the common electrode to be opposed to the storage capacitance electrode 151 is not extended from the address line 110b in the adjacent pixel region P2. In such cases, auxiliary capacitance common wiring is additionally laid between the address lines 110a and 110b, and this auxiliary capacitance cannon wiring is used as the common electrode 152 opposed to the storage capacitance electrode 150.

FIGS. 2 and 3 show the typical constitution of a pixel region in a conventional liquid crystal display, the pixel region having the circuit configuration shown in FIG. 1. FIG. 2 is a plan view showing the pixel region in a conventional liquid crystal display. FIG. 3 is a sectional view taken along the line I—I of FIG. 2.

In FIGS. 2 and 3, this liquid crystal display comprises address lines 110b and 110b formed on an insulative substrate 101. A gate insulating film 102 is formed thereon. Moreover, data lines 120a and 120b cross the address lines 110a and 110b are formed thereon. A pixel electrode 131 is arranged in a pixel region P1 enclosed with the address lines 110a, 110b and the data lines 120a, 120b. Also formed in this pixel region P1 is a TFT section 140 which includes a gate 141 extended from the address line 110a, a drain electrode 142 extended from the data line 120a, and a source electrode 143 connected to the pixel electrode 131. The connection between the source electrode 143 and the pixel electrode 131 is established by a conductive through hole 135 piercing through an upper insulating film 103. In this liquid crystal display, one end of the pixel electrode 131 is extended until it overlaps the address line 110b, so as to form a storage capacitance electrode 151. Accordingly, a storage capacitance section 150 is constituted with the address line 110b as a common electrode 152.

In the liquid crystal display shown in FIGS. 2 and 3, however, the storage capacitance electrode 151 and the can electrode 152 sandwiched both the gate insulating film 102 and the upper insulating film 103, i.e., dielectric layers of greater thickness. Therefore, per-area capacitance was small. On this account, a method has been devised in which a part of the address line 110b is extended into the pixel region as the common electrode 152 to increase the area of the storage capacitance section 150. Nevertheless, the non-transparent storage capacitance section made it difficult to secure both a sufficient aperture ratio and capacitance within the given pixel region, producing a problem of darker images.

FIG. 4 is a sectional view showing a pixel region in another conventional liquid crystal display. To solve the problem, the following structure has been proposed. That is, as shown in FIG. 4, the storage capacitance electrode 151 was formed over the address line 110b across the gate insulating film 102 by using the same metal film that constitutes the source electrode 143. This storage capacitance electrode 151 was connected to the pixel electrode 131 via a conductive through hole 136 piercing through the upper insulating film 103.

Recently, increased demand for high-resolution liquid crystal displays has shifted the dimensions of the pixel regions from a conventional order of e.g. 100 μm×300 μm to a latest order of 40 μm×120 μm. This not only demands higher working precision, but also requires that factors deteriorating the pixel aperture ratio be eliminated from the pixel regions as much as possible. Accordingly the configuration of FIG. 4 has become a problem in that a single pixel region requires two conductive through holes 135 and 136. That is, the formation of the conductive through holes 135, 136 had some limit in working precision. In particular, when the upper insulating film 103 used a thick film such as an organic insulative film for the sake of planarization, the size of through holes to be formed in this organic insulative film could be reduced only to a certain limit. For example, under existing processes, it is extremely difficult to form conductive through holes of 10 μm×10 μm or smaller with precision and with high yields. Thus, the presence of the two conductive through holes 135, 136 in a single pixel region has contributed to significant deterioration of the aperture ratio in high-resolution liquid crystal displays. For example, if a high-resolution pixel region of 40 μm×120 μm contains the two conductive through holes 135, 136 having the above-mentioned dimensions, the aperture ratio is no higher than 49%.

To solve the foregoing problems associated with the aperture ratio in high-resolution liquid crystal displays, the present inventors have devised to make the conductive through holes single. A similar technology in this view, Japanese Patent Laid-Open Publication No. Hei 9-152625, has proposed a liquid crystal display of single through hole type shown in FIGS. 5 and 6, for example. FIG. 5 is a plan view showing a pixel region in the conventional liquid crystal display of single through hole type. FIG. 6. is a sectional view taken along the line II—II of FIG. 5. In FIGS. 5 and 6, this liquid crystal display comprises address lines 210a and 210b formed on a transparent insulative substrate 201. Across a gate insulating film 202, data lines 220a and 220b crossing the address lines 210a and 210b are formed to constitute a pixel region. These data lines 220a and 220b have a double-layer structure consisting of a transparent conductive film 221 below and a metal film 222 above. This pixel region includes a gate 241, a drain electrode 242, a source electrode 243, wiring 253, a storage capacitance electrode 251, a pixel electrode 231, and a metal layer 254. The gate 241 is extended from the address line 210a. The drain electrode 242, consisting of an n+ type amorphous silicon film, is connected to a protrusion of the data line 220a extended into the pixel region. The source electrode 243, consisting of an n+ type amorphous silicon film, is to be selectively connected to the drain electrode 242 under a signal applied to the gate 241. The wiring 253, consisting of a transparent conductive film, is connected to a terminal of the source electrode 243. The storage capacitance electrode 251 is integrally extended from the wiring 253. The pixel electrode 231 is formed thereon across an upper insulating film 203, and is connected to the storage capacitance electrode 251 via a conductive though hole 236 that pierces through the upper insulating film 203. The metal layer 254 is arranged on the junction between the source electrode 243 and the wiring 253. This structure involves only a single conductive through hole (the conductive through hole 236), and thereby achieves an increase in aperture ratio.

Nevertheless, the liquid crystal display of single through hole type described above was hardly applicable due to the following problems. That is, in this type, the wiring 253 and the storage capacitance electrode 251 consisting of a transparent conductive film, typically of ITO, were formed between the gate insulating film 202 and the upper insulating film 203. This meant an additional patterning as compared with other conventional types. Then, the ITO patterning used aqua regia, whereas the drain electrode 242 and the source electrode 243 in the TFT section were formed of n+ type amorphous silicon films which dissolve in aqua regia. Therefore, an additional step for protecting the electrodes was required. Moreover, because the patterning of transparent conductive films is rather poor in working precision as compared with metal films, the storage capacitance electrode 251 patterned out of a transparent conductive film has more capacitance variations or defects. Accordingly, the pixels varied in image stability, which produced unevenness in the entire screen view. Furthermore, the wiring 253 was directly connected to the source electrode 243 made of an n+ type amorphous silicon film, whereas the connecting interface between an ITO film and an n+ type amorphous silicon film is high in contact resistance. This made a capacitance-charging time delay not-negligibly large, thereby hampering sufficient charging.

SUMMARY OF THE INVENTION

An object of the present invention is to provide a liquid crystal display, particularly of high resolution, which has an improved aperture ratio and high reliability as well as is simple in structure and capable of low-cost and high-yield fabrication, and which can neglect the capacitance-charging time delay, and a method of fabricating the same.

A liquid crystal display according to the present invention comprises: an insulative substrate; a plurality of address lines formed on the insulative substrate; a gate insulating film formed over said address lines; a plurality of data lines formed to cross said address lines provided said gate insulating film between said address lines and said data lines; an upper insulating film formed over said data lines; a pixel electrode formed on said upper insulating film in each of pixel regions enclosed with said address lines and said data lines, said pixel electrode consisting of a transparent conductive film for applying a potential to liquid crystal in respective pixel region; a thin film transistor section arranged in each of said pixel regions, said thin film transistor section having a gate connected to said address line and a pair of electrodes, one of which is connected to said data line, and selectively establishing connection between electrode connected to said data line and other electrode under a signal applied to their gate; a storage capacitance electrode arranged in each of said pixel regions, said storage capacitance electrode storing capacitance with a common electrode connected to said address line of adjacent pixel region or with an auxiliary capacitance common wiring formed on said insulative substrate so as to pass through said respective pixel region; a wiring connecting said storage capacitance electrode and said other electrode of said thin film transistor section; and a conductive through hole formed over said storage capacitance electrode and connects said storage capacitance electrode and said pixel electrode; wherein said storage capacitance electrode and said other electrode of said thin film transistor section that is connected to said pixel electrode through said wiring, said storage capacitance electrode and said conductive through hole are integrally formed of the same metal film.

In the present invention, each pixel region contains only a single conductive through hole. Therefore, particularly in a high-resolution liquid crystal display, the aperture ratio is improved as compared with the conventional pixel configuration which requires two conductive through holes. Moreover, the storage capacitance electrodes and the source electrodes are integrally formed of the same metal films. This permits the storage capacitance electrodes and the source electrodes to be formed in a single patterning operation, so that the fabrication are simplified to allow low-cost fabrication of the liquid crystal display. Furthermore, the integral formation of the storage capacitance electrodes and the source electrodes using the same metal films avoids the production of contact resistance between the electrodes, which eliminates charging delays. Besides, the precision workability of metal films enhances the pattern precision of the storage capacitance electrodes, and suppresses defects and capacitance variations.

In the present invention, for example, the storage capacitance electrodes are connected to the source electrodes of the thin film transistor section via wiring, and the wiring and the storage capacitance electrodes are arranged so as to overlap common electrodes across the gate insulating film. Accordingly, the common electrodes not only overlap the storage capacitance electrode but also overlap the wiring to allow an increase in storage capacitance.

Besides, for example, the common electrodes and the wiring are formed in a same width, and the common electrodes and the wiring are arranged so as to misalign with each other in a width direction. Alignment offsets in exposure systems can be compensated for by increasing the width of either the common electrodes or the wiring. However, this increasing of the width of either the common electrode or the wiring make aperture ratio lower. According to the present invention, since the common electrodes and the wiring have a same width and they are misaligned in a width direction, a drop in aperture ratio can be suppressed.

Moreover, the connecting portions of the storage capacitance electrodes to the conductive through holes, and the address lines or the auxiliary capacitance common wiring are arranged, for example, so as not to overlap each other across the gate insulating film.

Furthermore, the conductive through holes for establishing connection between the storage capacitance electrodes and the pixel electrodes are formed by, for example, etching the upper insulating film. If the storage capacitance electrodes have any chipped pattern on this etching, the etching can extend to the gate insulating film through the chipped portion, so that the through hole could reach the address line or the auxiliary capacitance common wiring below. When this through hole were subjected to a conductive treatment, leakage could occur between the storage capacitance electrode and the address line or the auxiliary capacitance common electrode. Nevertheless, the connecting portions of the storage capacitance electrodes to the conductive through holes, and the address lines or the auxiliary capacitance common wiring are arranged so as not to overlap each other across the gate insulating film. Therefore, the through holes, even if they reach the gate insulating film below, will not cause any leakage since no address line or auxiliary capacitance common wiring lies below.

Besides, for example, etch protective layers are arranged between the gate insulating film and the connecting portions of the storage capacitance electrodes to the conductive through holes. When the etch protective layers are arranged between the gate insulating film and the portions of the storage capacitance electrodes at which the conductive through holes come into connection, the etching protective layers block through holes from reaching the gate insulating film even if some storage capacitance electrodes have a chipped pattern. Thus, it is possible to avoid the deterioration of product yields resulting from leakage.

Moreover, the etch protective layers each are formed of e.g. an amorphous silicon film. Amorphous silicon films will not be eroded in the above-mentioned etching, and thus have the function of protecting the gate insulating film.

Furthermore, the data lines are shaped, for example, like a band of constant width. The drain electrodes of the TFT sections are formed to be included inside these band-shaped data lines. The inclusion of the drain electrodes in the band-shaped data lines prevents the drain-electrode portions of the TFT sections from protruding into the pixel regions, so that the aperture ratios of the pixel regions can be improved by that amount. Meanwhile, the drain electrodes are formed over the entire channel widths of the TFT sections, whereby the contact resistance between the drain electrodes and the channel layers are reduced for enhanced data write speed.

Additionally, the upper insulating film has, for example, a double-layer structure consisting of a first upper insulating film made of a silicon nitride film and a second upper insulating film made of an organic film. A color filter or a black matrix may be arranged between the first upper insulating film and the second upper insulating film.

A method of fabricating a liquid crystal display according to the present invention comprises: forming a plurality of address lines on an insulative substrate, and gates extended from said address lines in respective pixel regions; forming a gate insulating film over said address lines and said gates; forming, on said gate insulating film, a plurality of data lines crossing said address lines to make said pixel regions, in thin film transistor sections of said respective pixel regions, electrodes extended from said data lines and electrodes to be connected to pixel electrodes, and storage capacitance electrodes integrally extended from said electrodes to be connected to pixel electrodes by using the same metal films, said storage capacitance electrodes storing capacitance with said address lines of adjacent pixel regions; forming an upper insulating film over said data lines, said electrodes, and said storage capacitance electrodes; forming through holes in said upper insulating film so as to reach said storage capacitance electrodes; and forming said pixel electrodes on said upper insulating film as well as establishing connection between said pixel electrodes and said storage capacitance electrodes via said through holes.

According to the fabrication method of the present invention, a liquid crystal display can be fabricated which stores capacitance in between the storage capacitance electrodes and the address lines of adjacent pixel regions. Here, the data lines, the drain and source electrodes of the TFT sections, and the storage capacitance electrodes integrally extended from the source electrodes by using the same metal films can be formed together in a single patterning. This eliminates the need for an additional patterning for forming the storage capacitance electrodes. Besides, the use of metal films makes it possible to form the storage capacitance electrodes with high working precision.

Another method of fabricating a liquid crystal display according to the present invention comprises: forming a plurality of address lines on an insulative substrate, along with gates extended from said address lines and auxiliary capacitance common wiring in respective pixel regions; forming a gate insulating film over said address lines, said gates, and said auxiliary capacitance common wiring; forming, on said gate insulating film, a plurality of data lines crossing said address lines to make said pixel regions, in thin film transistor sections of said respective pixel regions, electrodes extended from said data lines and electrodes to be connected to pixel electrodes, and storage capacitance electrodes integrally extended from said electrodes to be connected to pixel electrodes by using the same metal films, said storage capacitance electrodes storing capacitance with said auxiliary capacitance common wiring; forming an upper insulating film over said data lines, said electrodes, and said storage capacitance electrodes; forming through holes in said upper insulating film so as to reach said storage capacitance electrodes; and forming said pixel electrodes on said upper insulating film as well as establishing connection between said pixel electrodes and said storage capacitance electrodes via said through holes.

According to this another fabrication method of the present invention, a liquid crystal display can be fabricated which stores capacitance in between the auxiliary capacitance common wiring and the storage capacitance electrodes. Again, the data lines, the drain and source electrodes of the TFT sections, and the storage capacitance electrodes integrally extended from the source electrodes by using the same metal films can be formed together in a single patterning. This eliminates the need for an additional patterning for forming the storage capacitance electrodes. Besides, the use of metal films makes it possible to form the storage capacitance electrodes with high working precision.

In the present invention, the forming the gate insulating film are followed by, for example, the provision of etch protective layers between the gate insulating film and the storage capacitance electrodes. Accordingly, even if the storage capacitance electrodes have any chipped pattern or the like on the following pattering of etching the upper insulating film to form through holes that reach the storage capacitance electrodes, the through holes can be precluded from eroding the gate insulating film for leakage.

For example, the etch protective layers are formed by using an amorphous silicon film while channel layers and contact layers each consisting of an amorphous silicon film are formed in the TFT sections on the gate insulating film. That is, the formation of the TFT sections in the pixel regions generally involves forming channel layers and contact layers on the gate insulating film out of amorphous silicon films. Thus, simultaneously with the formation of the channel layers and the contact layers, the same amorphous silicon films as those in the TFT sections can be formed beneath the connecting positions of the storage capacitance electrodes to the conductive through holes to form the etch protective layers with no additional patterning.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 9A through 9G are sectional views showing in the order of steps a method of fabricating a liquid crystal display according to the first embodiment;

DETAILED DESCRIPTION OF THE PREFERRED EMBODIMENT

Hereinafter, embodiments of the present invention will be described in detail with reference to the accompanying drawings.

EMBODIMENT 1

Figure 7:
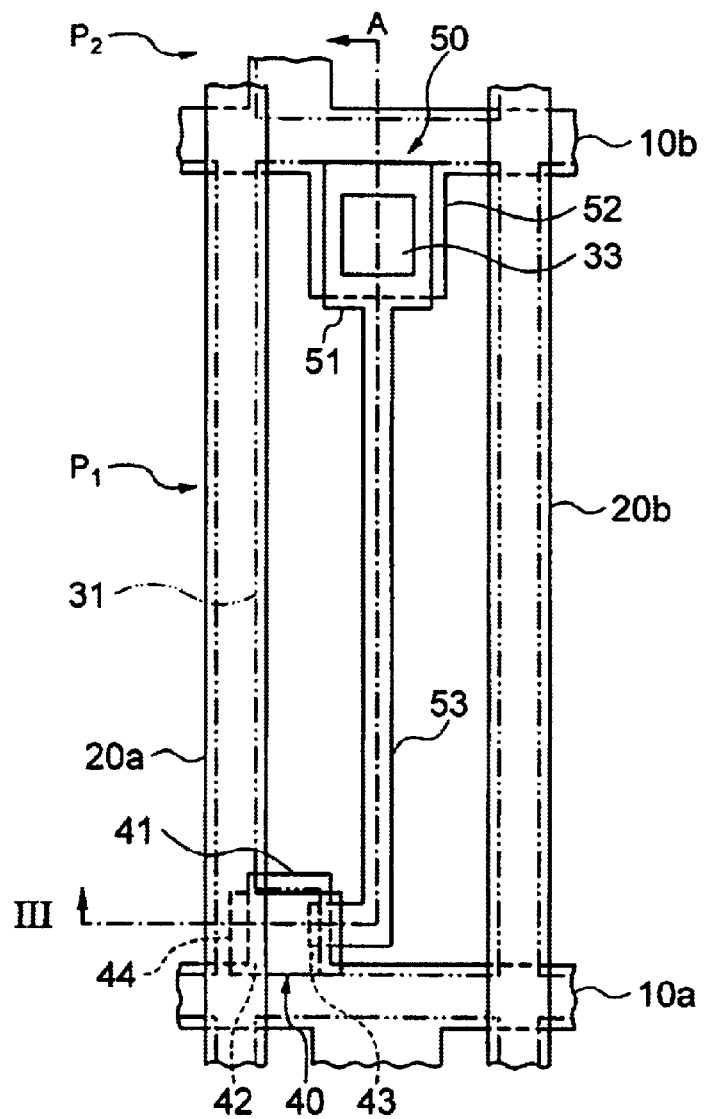
FIG. 7 is a plan view showing a single pixel region P1 on a TFT array substrate of the liquid crystal display according to a first embodiment of the present invention.
Figure 8:
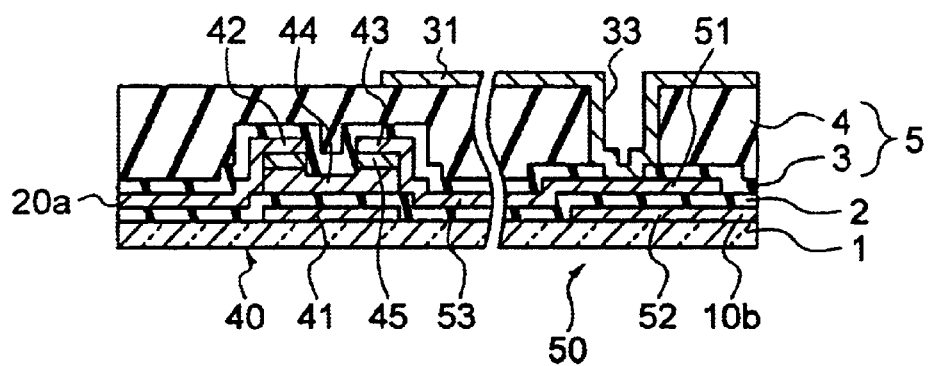
FIG. 8 is a sectional view taken along the line III—III of FIG. 7.

FIG. 7 is a plan view showing a single pixel region P1 on a TFT array substrate of the liquid crystal display according to a first embodiment of the present invention. FIG. 8 is a sectional view taken along the line III—III of FIG. 7. In FIG. 7, a pixel electrode 31 is shown by double-dashed chain lines.

In FIGS. 7 and 8, the liquid crystal display of the first embodiment comprises address lines 10a and 10b arranged in parallel with each other on an insulative substrate 1 made of transparent glass. A gate insulating film 2 consisting of a silicon nitride film is formed thereon. Band-shaped data lines 20a and 20b are arranged thereon in parallel with each other so as to cross the address lines 10a and 10b. The region enclosed with the address lines 10a, 10b and the data lines 20a, 20b makes a pixel region P1. Another pixel region P2 is similarly formed next to this pixel region P1.

A first upper insulating film 3 consisting of a silicon nitride film and a second upper insulating film 4 thereon, consisting of a photosensitive acrylic resin are formed over the layer the data lines 20a and 20b are formed in. On this second upper insulating film 4 is formed a pixel electrode 31 consisting of ITO. Hereinafter, the first upper insulating film 3 and the second upper insulating film 4 will be collectively referred to as "upper insulating film 5."

The pixel region P1 contains a TFT section 40. This TFT section 40 comprises a gate 41 extended from the address line 10a, a drain electrode 42 formed out of a part of the band-shaped data line 20a, and a source electrode 43 connected to the pixel electrode 31. Here, the drain electrode 42 and the source electrode 43 are selectively connected to each other under a scanning line signal applied to the gate 41.

The address lines 10a, 10b, the data lines 20a, 20b, the drain electrode 42, and the source electrode 43 may be formed of either identical or different materials, including single-layer films, multilayer films, and alloy films of Al, Mo, and Cr.

The pixel region P1 also contains a storage capacitance section 50. This storage capacitance section 50 comprises a common electrode 52 and a storage capacitance electrode 51. The common electrode 52 is extended from the address line 10b of the adjacent pixel region P2 into the pixel region P1. The storage capacitance electrode 51 sandwiches the gate insulating film 2 with the common electrode 52 to store capacitance therebetween. This storage capacitance electrode 51 is formed integral with the source electrode 43 of the TFT section 40 via wiring 53 by using the same metal film. The storage capacitance electrode 51 is also connected to the pixel electrode 31 via a conductive through hole 33 which pierces through the upper insulating film 5.

When a scanning line signal is applied to the address line 10a and an image signal is applied to the data line 20a, this liquid crystal display establishes the connection between the drain electrode 42 and the source electrode 43 in the TFT section 40. Thus, the image signal potential reaches the storage capacitance section 50 through the wiring 53, so that the storage capacitance electrode 51 and the common electrode 52 store capacitance therebetween. In the meantime, a potential for driving the liquid crystal is applied to the pixel electrode 31 via the conductive through hole 33. Then, even after the scanning line signal is turned OFF, the capacitance stored in the storage capacitance section 50 retains the liquid-crystal-driving potential on the pixel electrode 31 until the application of a next scanning line signal and a next image signal.

The pixel electrode 31 is formed so as to overlap respective edges of the address lines 10a, 10b, data lines 20a, 20b, and TFT section 40 across the upper insulating film 5. This avoids light leakage through the rim of the pixel electrode 31, thereby allowing a reduction in black matrix width to contribute to an improvement in pixel aperture ratio.

Figure 4:
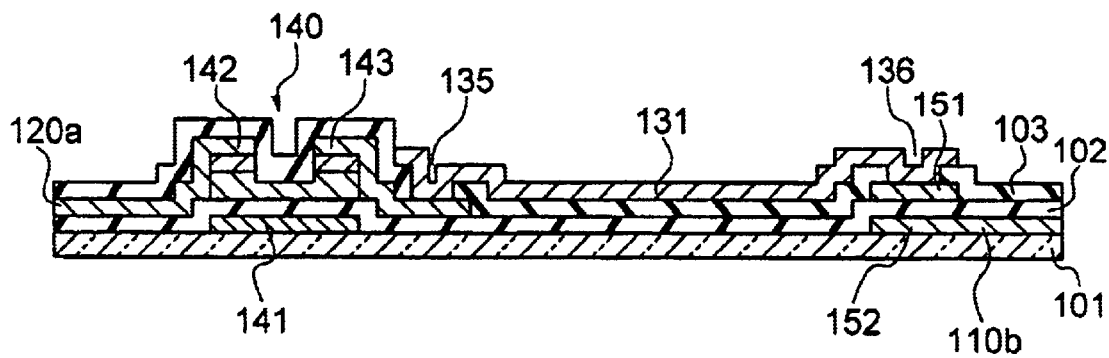
FIG. 4 is a sectional view showing a pixel region in another conventional liquid crystal display.

Turning now to a comparison between the liquid crystal display of the first embodiment shown in FIGS. 7, 8 and the conventional example shown in FIG. 4: in the first embodiment, the connection among the source electrode 43, the storage capacitance electrode 33, and the pixel electrode 31 is established by the wiring 53 and the single conductive through hole 33. Meanwhile, in the conventional example, the connection between the source electrode 143 and the pixel electrode 131 is established by the conductive through hole 135 and the connection between the pixel electrode 131 and the storage capacitance electrode 151 is established by the conductive through hole 136, which means that the two conductive through holes 135 and 136 are formed in the pixel region. Here, a comparison between the area of the single conductive through hole 33 and the area of the wiring 53 indicates that with increasing resolution of the pixel region, the wiring 53 can be decreased both in length and in width for reduced area, while the area reduction on the conductive through hole 33 has the above-mentioned limit because of working precision. Accordingly, for high-resolution liquid crystal displays, the first embodiment with the combination of the wiring 53 and the single conductive through hole 33 provides a greater improvement in aperture ratio.

Figure 5:
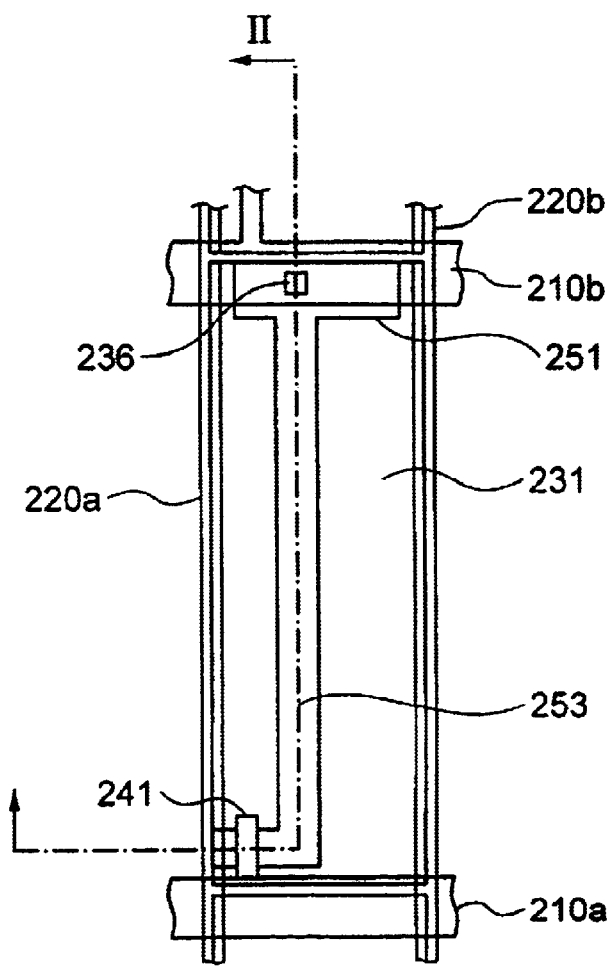
FIG. 5 is a plan view showing a pixel region in a conventional liquid crystal display of single through hole type.
Figure 6:
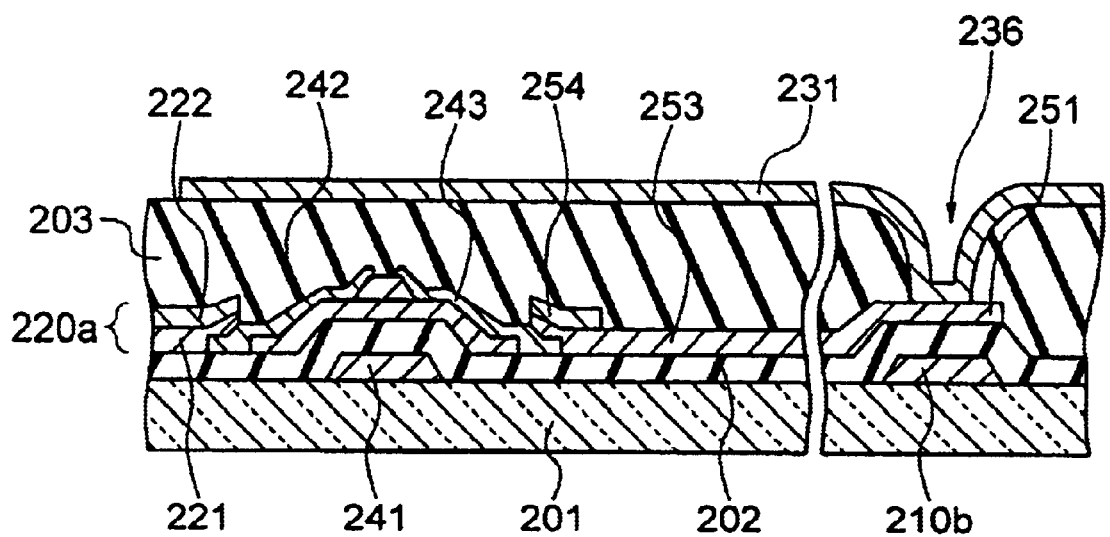
FIG. 6 is a sectional view taken along the line II—II of FIG. 5.

Turning now to a comparison between the liquid crystal display of the first embodiment and the conventional example shown in FIGS. 5 and 6: in the first embodiment, the data line 20a and the drain electrode 42 are integrally formed of the same metal film; besides, the storage capacitance electrode 51 and the source electrode 42 are formed integral with the wiring 53 out of the same metal film. On the other hand, in the conventional example mentioned above, the drain electrode 242 and the source electrode 243 are made of an n+ type amorphous silicon film, and the data line in contact with this drain electrode 242 is the ITO film 221. Moreover, the wiring 253 in contact with the source electrode 243, and the storage capacitance electrode 251 are also made of an ITO film.

In the first embodiment, the data line 20a and the drain electrode 42, as well as the source electrode 43, the wiring 53, and the storage capacitance electrode 51, are integrally made of the same metal film, and therefore can be formed together in a single patterning operation. This means no additional fabrication for forming the storage capacitance electrode 51. Moreover, the absence of junctions between the data line 20a and the drain electrode 42, and among the source electrode 43, the wiring 53, and the storage capacitance electrode 51 eliminates such high contact resistance as exists between the conventional n+ type amorphous silicon film and ITO films, thereby causing no charge delays. In addition, typical metal films are considerably finer in working precision than ITOs and the like. Therefore, the storage capacitance electrode 51 is high in pattern precision and is suppressed low in storage capacitance variation. Furthermore, in the first embodiment, the high pattern precision also suppresses write voltage variations and luminance variations.

For example, the storage capacity electrodes of the first embodiment, formed of metal films and conventional storage capacity electrodes formed of ITO films were tested on variations, with the following results:

| Embodiment 1 | | Conventional example using ITO |
|---|---|---|
| Capacitance variation | ±9.4% | ±18.9% |
| Write voltage variation | ±0.14 V | ±0.29 V |
| Luminance (halftone) variation | ±9.6% | ±21.0% |

This clearly shows that the use of metal films improves the pattern precision.

Moreover, in the liquid crystal display of the first embodiment, the TFT section 40 has the drain electrode 42 that is included in the band-shaped data line 20a. Besides, the pixel electrode 31 overlaps the respective edges of the surrounding address lines 10a, 10b, data lines 20a, 20b, and TFT section 40 at its rim for light leakage prevention. These arrangements further improve the aperture ratio.

The liquid crystal display of the first embodiment can be fabricated in the following steps. Here, the description will be limited to the formation of pixel regions. FIGS. 9A through 9G are sectional views showing in the order of steps a method of fabricating the liquid crystal display of the first embodiment.

Initially, as shown in FIG. 9A, Cr or other metal is laid on an insulative substrate 1 made of glass so as to form address lines 10a, 10b, . . . having a thickness of e.g. 100–400 nm in parallel with each other. The individual address lines 10a, 10b, . . . are patterned so that gates 41 are extended into TFT sections 40 and common electrodes 52 are extended into storage capacitance sections 50 in respective pixel regions P1, P2, . . . .

Next, as shown in FIG. 9B, a gate insulating film 2 consisting of e.g. a silicon nitride film is formed over the entire surface of the insulative substrate 1 on which the address lines 10a, . . . are formed. Subsequently, as shown in FIG. 9C, 300-nm-thickness intrinsic amorphous silicon films 44 to be channel layers are formed over the gates 41 across the gate insulating film 2. Besides, 50-nm-thickness n+ type amorphous silicon films 45 to be contact layers are formed thereon. Then, through omitted of illustration, patterning is conducted to form channel layers 44 and contact layers 45.

Next, as shown in FIG. 9D, a plurality of data lines 20a, 20b, . . . to cross the address lines 10a, 10b, . . . are formed in parallel with each other on the gate insulating film 2. The data lines 20a, 20b, . . . are formed in the shape of a band. These band-shaped data lines 20a, 20b, . . . are arranged so that side portions thereof cover the channel layers 44 and the contact layers 45 in part. Thereby, the data lines 20a, 20b, . . . constitute drain electrodes 42 of the TFT sections 40 at the portions covering the channel layers 44 and the contact layers 45.

While forming the data lines 20a, 20b, . . . , the same patterning operation also forms circuits each including a source electrode 43, wiring 53, and a storage capacitance electrode 51. These circuits and the data lines 20a, 20b, . . . are formed by using the same metal as that constituting the address lines 10a, 10b, . . . , so as to have a thickness of e.g. 100–400 nm.

Next, as shown in FIG. 9E, the entire pixel region P1 is covered with a first upper insulating film 3 made of e.g. a silicon nitride film having a thickness of 100–200 nm. Moreover, as shown in FIG. 9F, a second upper insulating film 4 consisting of e.g. a photosensitive acrylic resin resist film having a thickness of 2.0–4.5 μm is formed over the first upper insulating film 3. Here, the resist film is subjected to pattern exposure and development to form a through hole 34 at a position over the storage capacitance electrode 51. Then, wet etching or dry etching is performed by using the resist film pattern (not shown) as a mask, so that a through hole 35 that reaches the storage capacitance electrode 51 is formed in the first upper insulating film 3 at that position. Incidentally, the resist film pattern is not always necessary. For example, the wet etching or dry etching may be performed by using the photosensitive acrylic resin as the mask.

Next, as shown in FIG. 9G, a pixel electrode 31 consisting of e.g. an ITO film having a thickness of 40–100 nm is formed on the second upper insulating film 4. This ITO film is also formed over the walls of the through holes 34 and 35, so that the through holes 34 and 35 make a conductive through hole 33 that reaches the storage capacitance electrode 51.

Through the foregoing steps, the pixel region P1 of the first embodiment is formed.

According to this fabrication method, the data lines 20a, 20b, . . . the drain and source electrodes 42, 43 in the TFT section 40, and the wiring 53 and the storage capacitance electrode 51 integrally extended from the source electrode 43 by using the same metal film can be formed together in a single patterning. This eliminates the need for an additional patterning for forming the storage capacitance electrode. In addition, since it is formed of the same metal as that constituting the source electrode 43, the storage capacitance electrode 51 has excellent working precision, fewer defects, small storage capacitance variations, and high production yields.

Figure 1:
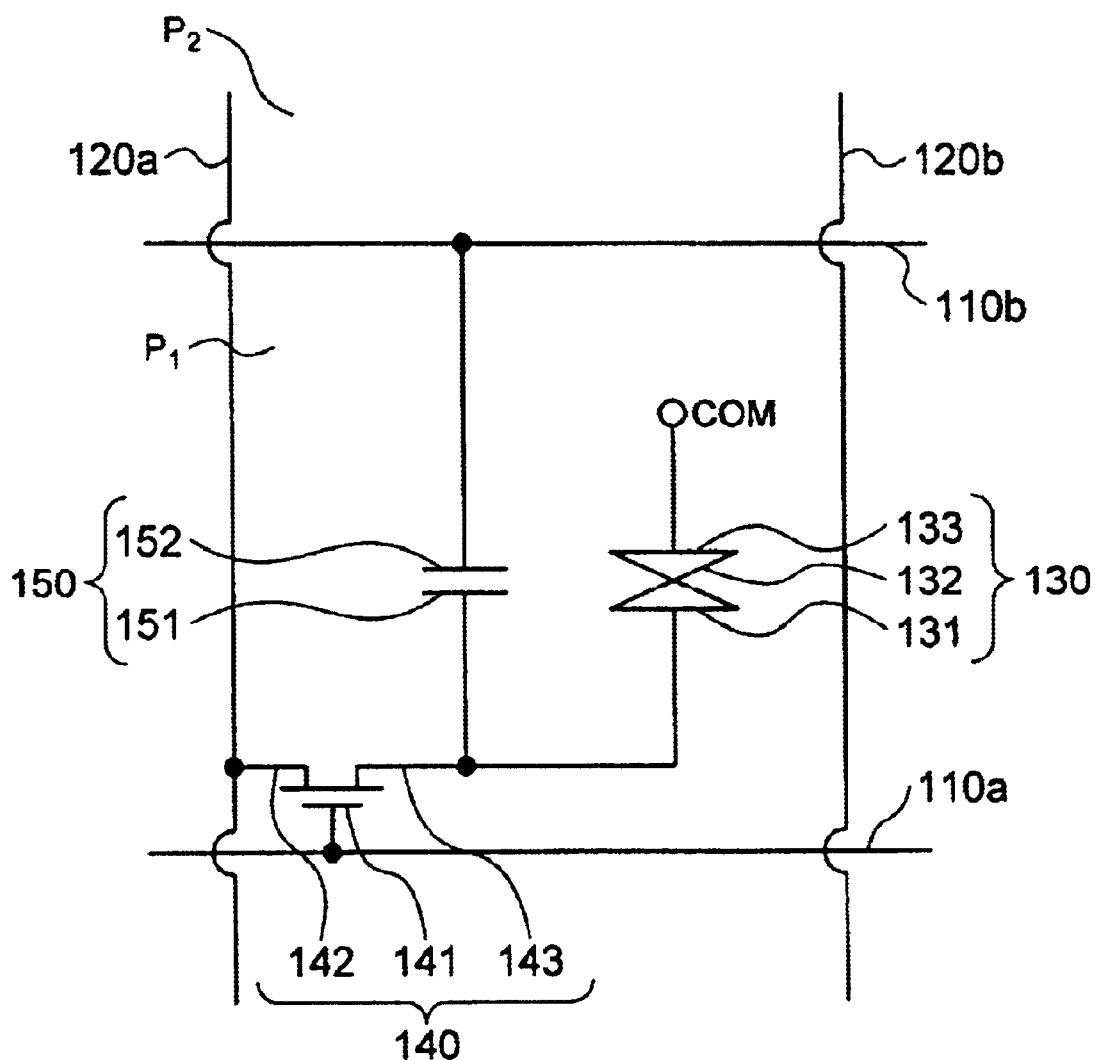
FIG. 1 is a circuit diagram showing the circuit configuration of a single pixel region in a conventional liquid crystal display.
Figure 2:
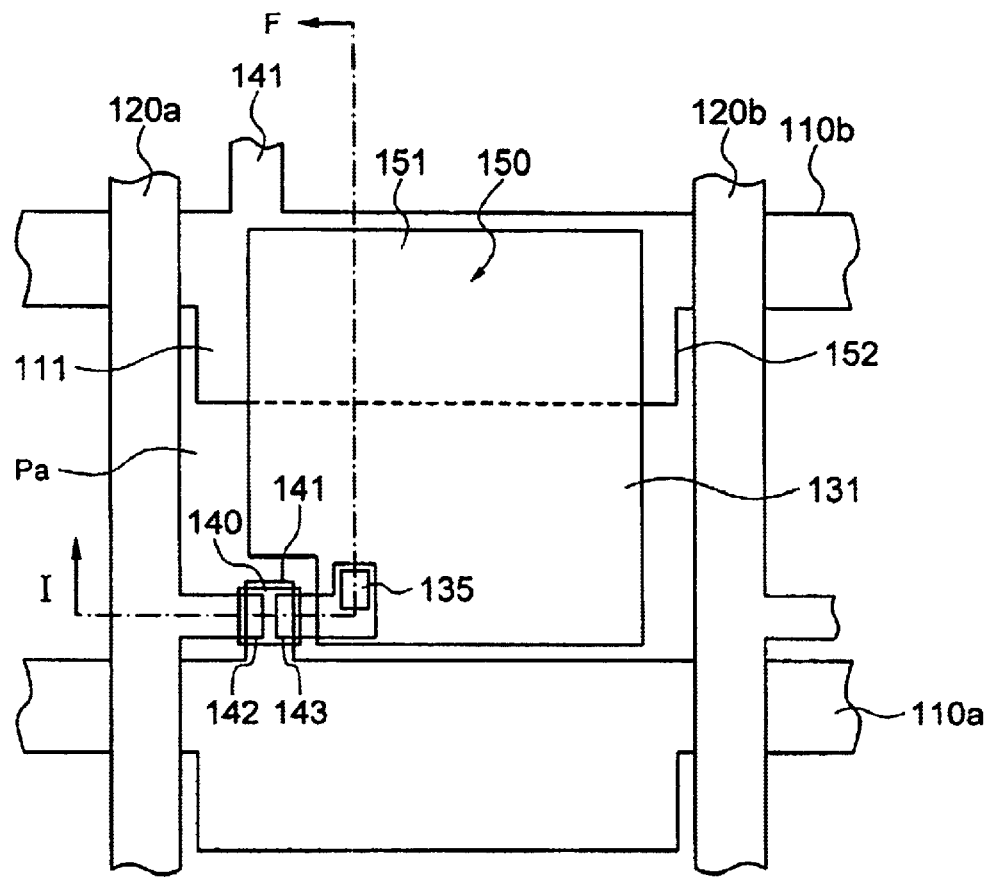
FIG. 2 is a plan view showing a pixel region in the conventional liquid crystal display, the pixel region having the circuit configuration shown in FIG. 1.
Figure 3:
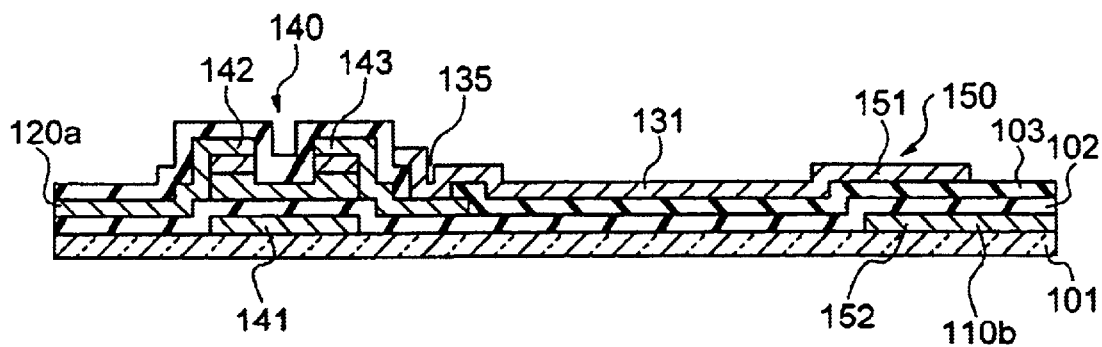
FIG. 3 is a sectional view taken along the line I—I of FIG. 2.
Figure 10:
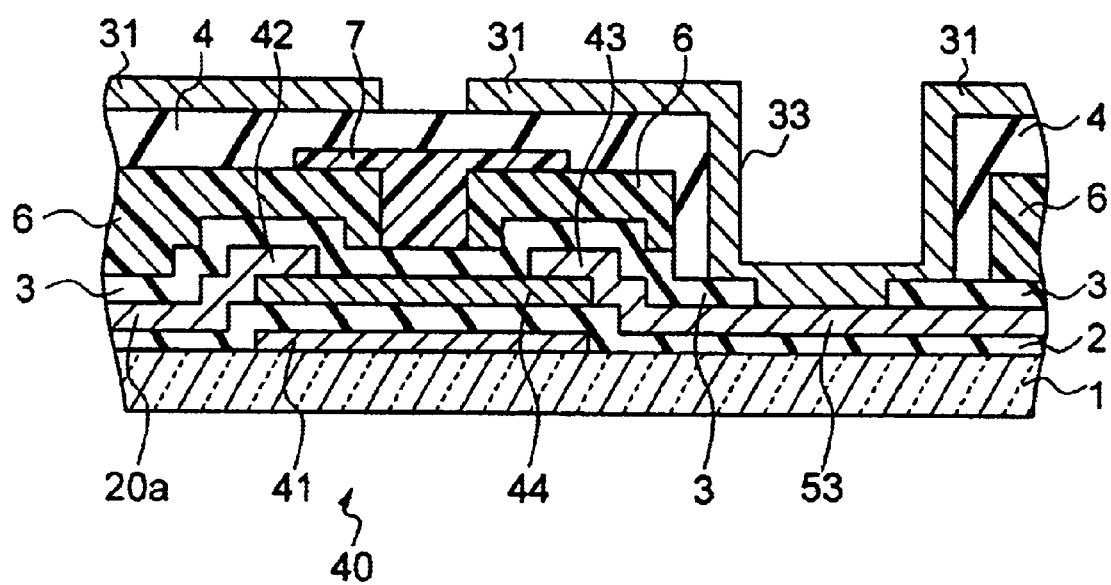
FIG. 10 is a sectional view showing a modified example of the first embodiment.

FIG. 10 is a sectional view showing a modified example of the first embodiment. In the first embodiment shown in FIGS. 1 to 3, the TFT array substrate has no built-in color filter or black matrix, and on the counter-substrate side a color filter and a black matrix is arranged. Nevertheless, as shown in FIG. 10, a color filter 6 and a black matrix 7 may be incorporated into the TFT-array-substrate side to constitute a so called color filter on TFT (CF on TFT). In this TFT array substrate, a color filter 6 is inserted to below the pixel-electrode area, between the first upper insulating film 3 and the second upper insulating film 4. A black matrix 7 is also interposed between the first upper insulating film 3 and the second upper insulating film 4 so as to provide a light shield in the TFT channel region. These color filter 6 and black matrix 7, consisting of transparent resins containing pigments, must not be arranged on the forming area of the conductive through hole 33. In FIG. 10, a storage capacitance electrode and a common electrode are not shown. The storage capacitance electrode and the common electrode may be constituted as shown in FIG. 12.

EMBODIMENT 2

Figure 11:
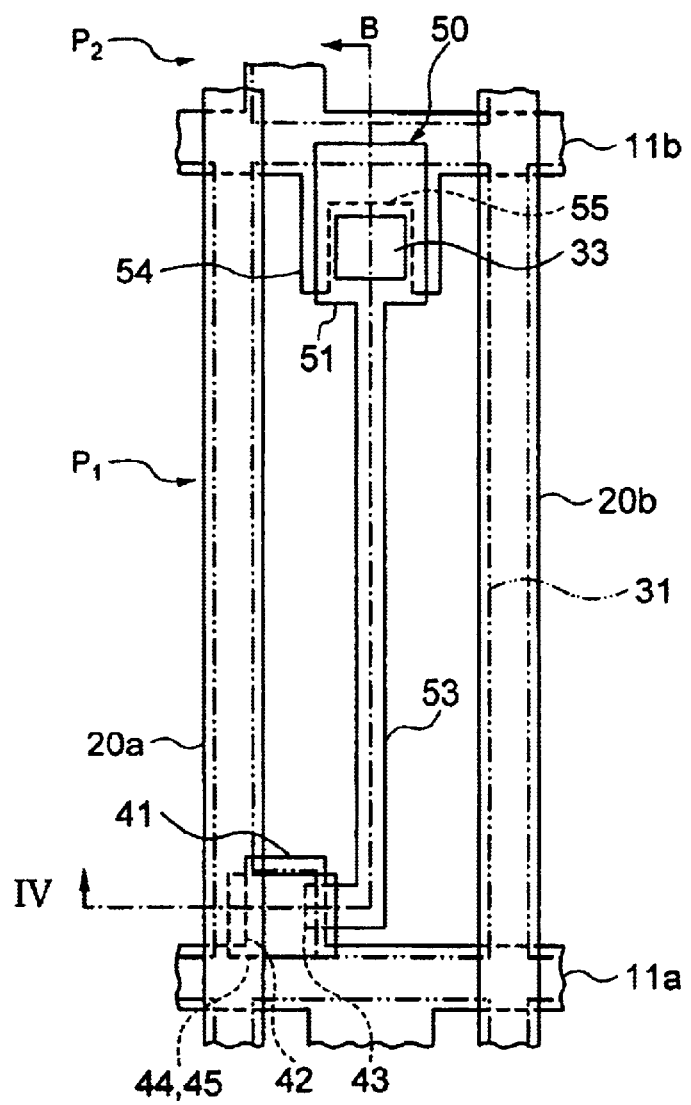
FIG. 11 is a plan view showing a single pixel a TFT array substrate of the liquid crystal display a second embodiment of the present invention.

FIG. 11 is a plan view showing a single pixel region P1 on a TFT array substrate of the liquid crystal display according to a second embodiment of the present invention. FIG. 12 is a sectional view taken along the line IV—IV of FIG. 11. In FIG. 11, a pixel electrode 31 is shown by double-dashed chain lines.

Figure 12:
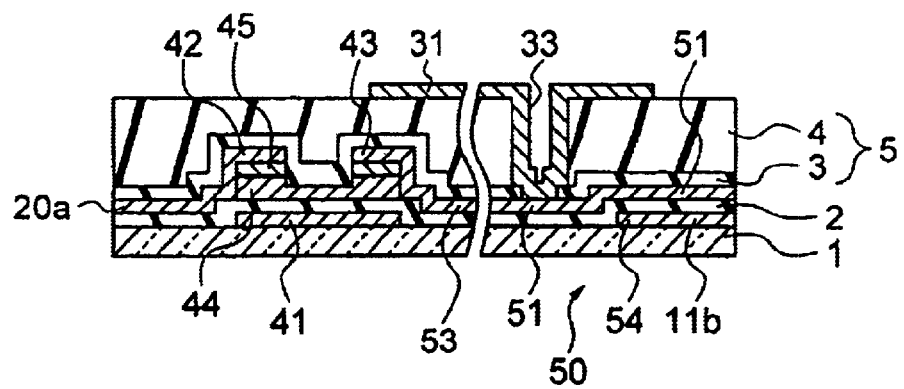
FIG. 12 is a sectional view taken along the line IV—IV of FIG. 11.

The liquid crystal display of the second embodiment shown in FIGS. 11 and 12 is intended to prevent leakage between a storage capacitance electrode 51 and a common electrode 54, which can possibly be produced by in-process defects. This liquid crystal display is identical to that of the first embodiment except in the configuration of the storage capacitance section 50. Therefore, description will now be made mainly on the configuration of the storage capacitance section 50.

In FIGS. 11 and 12, this storage capacitance section 50 comprises a common electrode 54 and a storage capacitance electrode 51. The common electrode 54 is extended from an address line 11b of an adjacent pixel region P2 into the pixel region P1. The storage capacitance electrode 51 sandwiches a gate insulating film 2 with the common electrode 54 to store capacitance therebetween. This storage capacitance electrode 51 it fonmed integral with a source electrode 43 of a TFT section 40 via wiring 53 by using the same metal film. The storage capacitance electrode 51 is also connected to the pixel electrode 31 via a conductive through hole 33 which pierces through an upper insulating film 5.

A notch 55 is formed in the common electrode 54. This notch 55 is formed so as to prevent the projection of the conductive through hole 33 from overlapping the common electrode 54. If the storage capacitance electrode 51 under fabrication is chipped at an exposed portion in a through hole 33 and then the upper insulating film 5 is etched in the following to form the through hole 33, the through hole can reach the gate insulating film 2 beneath. Nevertheless, the absence of the common electrode 54 and the address line lib beneath eliminates the possibility that the storage capacitance section 50 and the common electrode 54 are connected to each other via an ITO film which would cause leakage.

The fabrication method of the second embodiment is substantially the same as that of the first embodiment, excepting in that the shape of the common electrode 54 is altered to form the notch 55. Thus, description thereof will be omitted here.

EMBODIMENT 3

Figure 13:
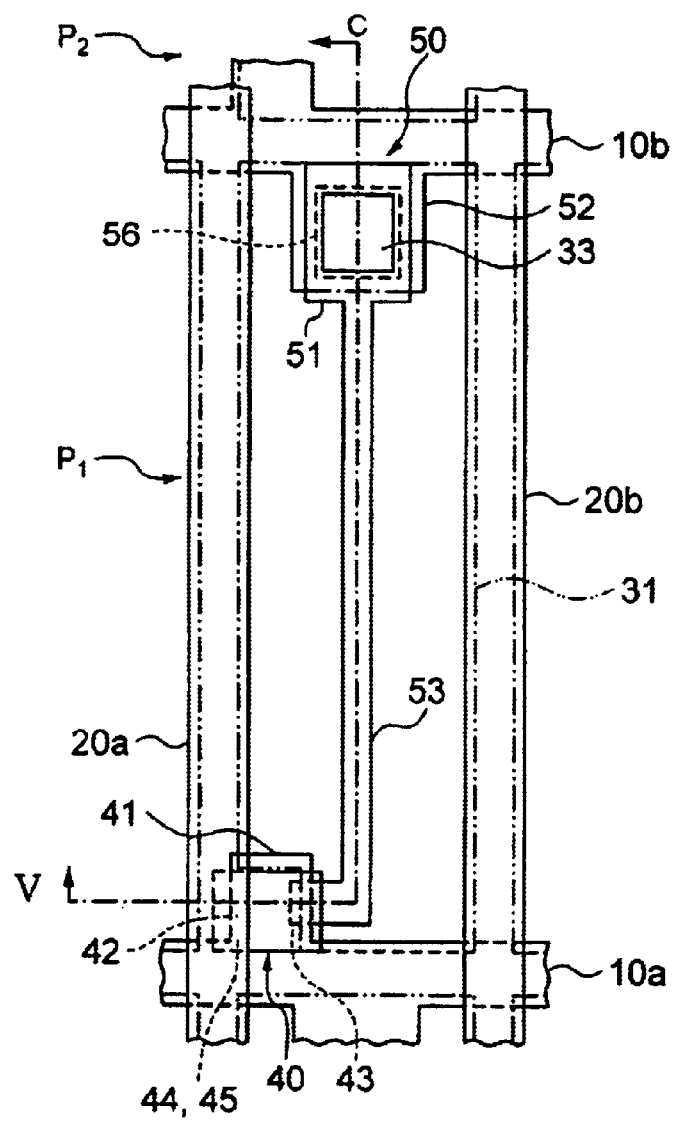
FIG. 13 is a plan view showing a single pixel a TFT array substrate of the liquid crystal display a third embodiment of the present invention.
Figure 14:
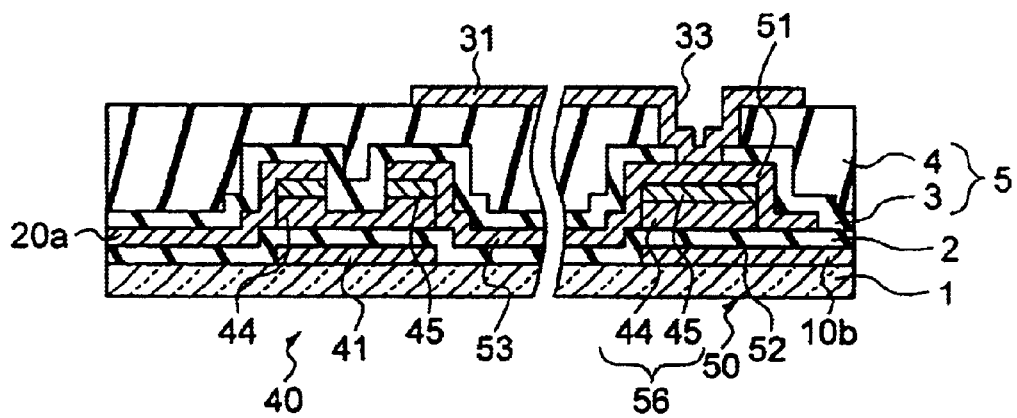
FIG. 14 is a sectional view taken along the line V—V of FIG. 13.

FIG. 13 is a plan view showing a single pixel region P1 on a TFT array substrate of the liquid crystal display according to a third embodiment of the present invention. FIG. 14 is a sectional view taken along the line V—V of FIG. 13. In FIG. 13, a pixel electrode 31 is shown by double-dashed lines.

This third embodiment is intended to prevent leakage between a storage capacitance electrode 51 and a common electrode 54, which can possibly be produce by in-process defects. As compared with the second embodiment, the third embodiment is intended for consistency between an improvement in aperture ratio and an increase in capacitance.

In this third embodiment, an etch protective layer 56 is interposed between the storage capacitance electrode 51 and a gate insulating film 2.

In FIGS. 13 and 14, the liquid crystal display of the third embodiment comprises address lines 10a and 10b arranged in parallel with each other on an insulative substrate 1 made of transparent glass. The gate insulating film 2 consisting of e.g. a silicon nitride film is formed thereon. Band-shaped data lines 20a and 20b are arranged thereon in parallel with each other so as to cross the address lines 10a and 10b. The region enclosed with the address lines 10a, 10b and the data lines 20a, 20b makes a single pixel region P1. Another pixel region P2 is similarly formed next to this pixel region P1.

A first upper insulating film 3 consisting of, for example, a silicon nitride film, and a second upper insulating film 4 thereon, consisting of a photosensitive acrylic resin. These films are formed over the layer in which the data lines 20a and 20b are formed. On this second upper insulating film 4 is formed a pixel electrode 31 consisting of ITO.

A TFT section 40 has a channel layer consisting of an intrinsic amorphous silicon film 44 and a contact layer consisting of an n+ type amorphous silicon film 45. The amorphous silicon film 44 is formed opposite to a gate 41 across the gate insulating film 2, the gate 41 being extended from the address line 10a. The amorphous silicon film 45 is formed thereon. The band-shaped data line 20a is arranged so that its side portion partially covers the amorphous silicon films 44 and 45 to form a drain electrode 42 of the TFT section 40.

A storage capacitance section 50 includes a common electrode 52 and an etch protective layer 56. The common electrode 52 is extended from the address line 10b of the adjacent pixel region P2 into the pixel region P1. The etching preventive layer 56, consisting of an intrinsic amorphous silicon film 44 and an n+ type amorphous silicon film 45 in order, in formed opposite to the common electrode across the gate insulating film 2. The storage capacitance electrode 51 is formed thereon. This storage capacitance electrode 51 is formed integral with a source electrode 43 of the TFT section 40 via wiring 53 by using the same metal film. The storage capacitance electrode 51 is also connected to the pixel electrode 31 via a conductive through hole 33 which pierces through the upper insulating film 5.

The etch protective layer 56 has such shape and size that the projection of the conductive through hole 33 is accommodated therein.

In the liquid crystal display of the third embodiment, even if the storage capacitance electrode 51 is chipped in process, the amorphous silicon films 44 and 45 function as the etch protective layer 56 when the upper insulating film 5 is etched in the following steps to form a through hole 33. This precludes the etching of the gate insulating film 2, thereby avoiding leakage between the storage capacitance electrode 51 and the common electrode 52. According to the constitution of the third embodiment, it is possible to form a through hole above the common electrode 52. This provides better consistency between an improvement in aperture ratio and an increase in capacitance as compared with the second embodiment.

Figure 15:
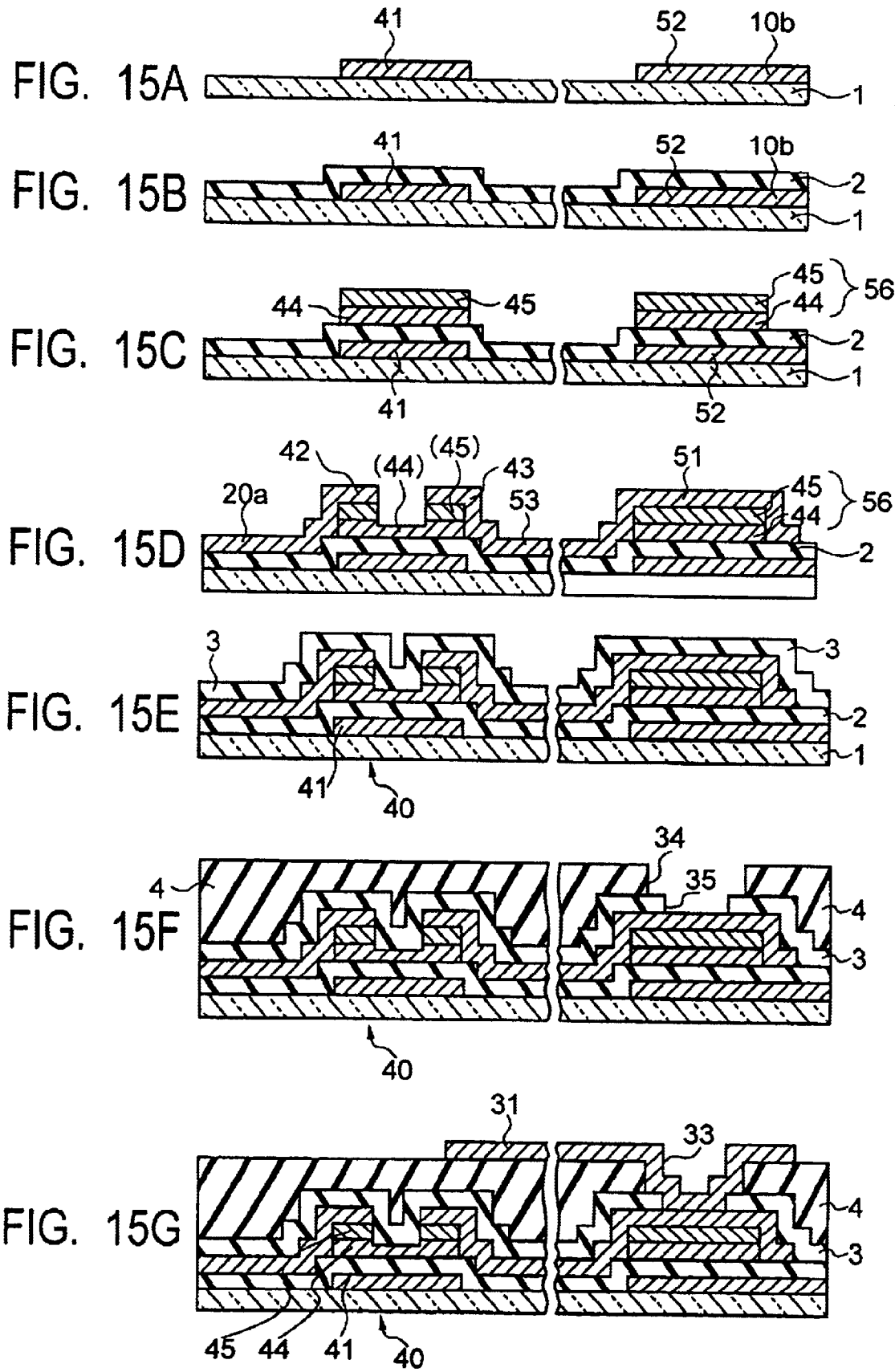
FIGS. 15A through 15G are sectional views showing in the order of steps a method of fabricating a liquid crystal display according to the third embodiment.

FIGS. 15A through 15G are sectional views showing in the order of steps a method of fabricating the liquid crystal display of the third embodiment. Initially, as shown in FIG. 15A, metal is laid on an insulative substrate 1 made of glass so as to form address lines 10a, 10b, . . . having a thickness of e.g. 100–400 nm. The individual address lines 10a, 10b, . . . are patterned so that gates 41 are extended into TFT sections 40 and common electrodes 52 are extended into storage capacitance sections 50 in respective pixel regions P1, P2, . . . .

Next, as shown in FIG. 15B, a gate insulating film 2 consisting of e.g. a silicon nitride film is formed over the entire surface of the insulative substrate 1 on which the address lines 10a, . . . are formed.

Then, as shown in FIG. 15C, intrinsic amorphous silicon films 44 to make TFT channel layers and n+ type amorphous silicon films 45 to make contact layers above are successively formed opposite to the gates 41 across the gate insulating film 2. In the meantime, the same patterning operations also successively form etch protective layers 56 each consisting of an intrinsic amorphous silicon film 44 and an n+ type amorphous silicon film 45, at positions opposite to the common electrodes 52 across the gate insulating film 2, Then, though omitted of illustration, the intrinsic amorphous silicon films 44 and the n+ type amorphous silicon films 45 in the TFT sections 40 are patterned to shape channel layers 44 and contact layers 45.

Next, as shown in FIG. 15D, a plurality of data lines 20a, 20b, . . . to cross the address lines 10a, 10b, . . . are formed in parallel with each other on the gate insulating film 2 by using the same metal as that constituting the address lines 10a, 10b, . . . . The data lines 20a, 20b, . . . are formed in the shape of a band. These band-shaped data lines 20a, 20b, . . . are arranged so that side portions thereof cover the channel layers 44 and the contact layers 45 in part. Thereby, the data lines 20a, 20b, . . . make drain electrodes 42 of the TFT sections 40 at the portions covering the channel layers 44 and the contact layers 45.

While forming the data lines 20a, 20b, . . . , the same pattering operation also forms circuits each including a source electrode 43, wiring 53, and a storage capacitance electrode 51 by using the sane metal as that constituting the address lines 10a, 10b, . . . .

Next, as shown in FIG. 15E, the entire pixel region P1 is covered with a first upper insulating film 3 consisting of e.g. a silicon nitride film. In addition, as shown in FIG. 15F, a second upper insulating film 4 consisting of e.g. a photo-sensitive acrylic resin resist film is formed over the first upper insulating film 3. Here, the resist film is subjected to pattern exposure and development to form a through hole 34 over the storage capacitance electrode 51. Then, wet etching or dry etching is performed by using the resist film pattern (now shown) as a mask, so that a through hole 35 that reaches the storage capacitance electrode 51 is formed.

Next, as shown in FIG. 15G, a pixel electrode 31 consisting of e.g. an ITO film is formed on the second upper insulating film 4. This ITO film is also formed over the walls of the through holes 34 and 35, so that the through holes make a conductive through hole 33 that reaches the storage capacitance electrode 51.

Through the foregoing steps, the pixel region P1 of the third embodiment is formed.

According to this fabrication method, it is possible to form the etch protective layers 56 in the same patterning by using the same amorphous silicon films 44, 45 while forming the channel layers and the contact layers in the TFT sections 40. Therefore, no additional step for forming the etch protective layers 56 is required.

EMBODIMENT 4

Figure 16:
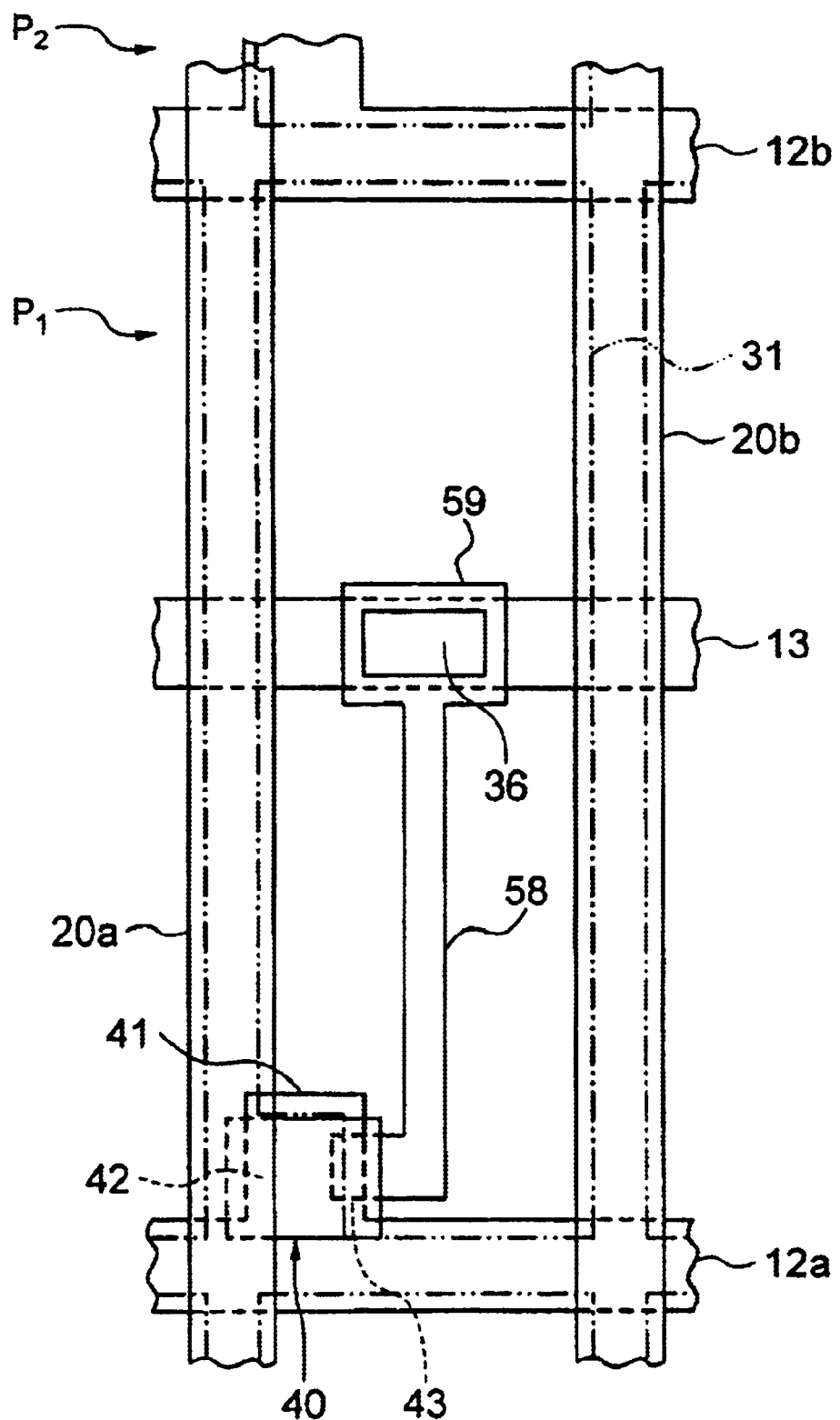
FIG. 16 is a plan view showing a single pixel region P1 on a TFT array substrate of the liquid crystal display according to a fourth embodiment of the present invention.

FIG. 16 is a plan view showing a single pixel region P1 on a TFT array substrate of the liquid crystal display according to a fourth embodiment of the present invention. In FIG. 16, a pixel electrode 31 is shown by double-dashed chain lines.

This fourth embodiment is an example where auxiliary capacitance common wiring is formed independent of address lines, so as to form the counter electrodes for storage capacitance electrodes. As shown in FIG. 16, this liquid crystal display has address lines 12a and 12b formed on an insulative substrate, and auxiliary capacitance common wiring 13 formed through the pixel region P1 in parallel with the address lines 12a and 12b. Band-shaped data lines 20a and 20b are formed above this layer across a gate insulating film so as to cross the address lines 12a and 12b. A TFT section 40 is provided with a gate 41 extended from the address line 12a, a drain electrode 42 formed on a part of the band-shaped data line 20a, and a source electrode 43. From this source electrode 43, a storage capacitance electrode 59 is extended via wiring 58. The storage capacitance electrode 59 is formed integral with the source electrode 43 and the wiring 58 by using the same metal film, at a position opposite to the auxiliary capacitance common wiring 13 across the gate insulating film. A pixel electrode 31 consisting of a transparent conductive film for applying a potential to the liquid crystal in the pixel region P1 is formed thereon across an upper insulating film. This pixel electrode 31 is connected to the storage capacitance electrode 59 via a conductive through hole 36 formed in the upper insulating film.

In general, when the pixel region P1 utilizes an adjacent address line 10b as the constant-potential-side electrode of its storage capacitance section 50, the storage capacitance section 50 of the pixel region P1 shall vary in capacitance at the instant when the address line 10b is driven to apply a rewrite signal to a pixel region P2. On the other hand, in the liquid crystal display of this fourth embodiment, the pixel region P1 stores its capacitance between the storage capacitance electrode 59 and the auxiliary capacitance common electrode 13 which is free from potential variations. Therefore, as compared with the case where the address line 12b of the adjacent pixel region is used as the counter electrode, the voltages applied to the liquid crystal become stabilized, creating more uniform display images.

EMBODIMENT 5

Figure 17:
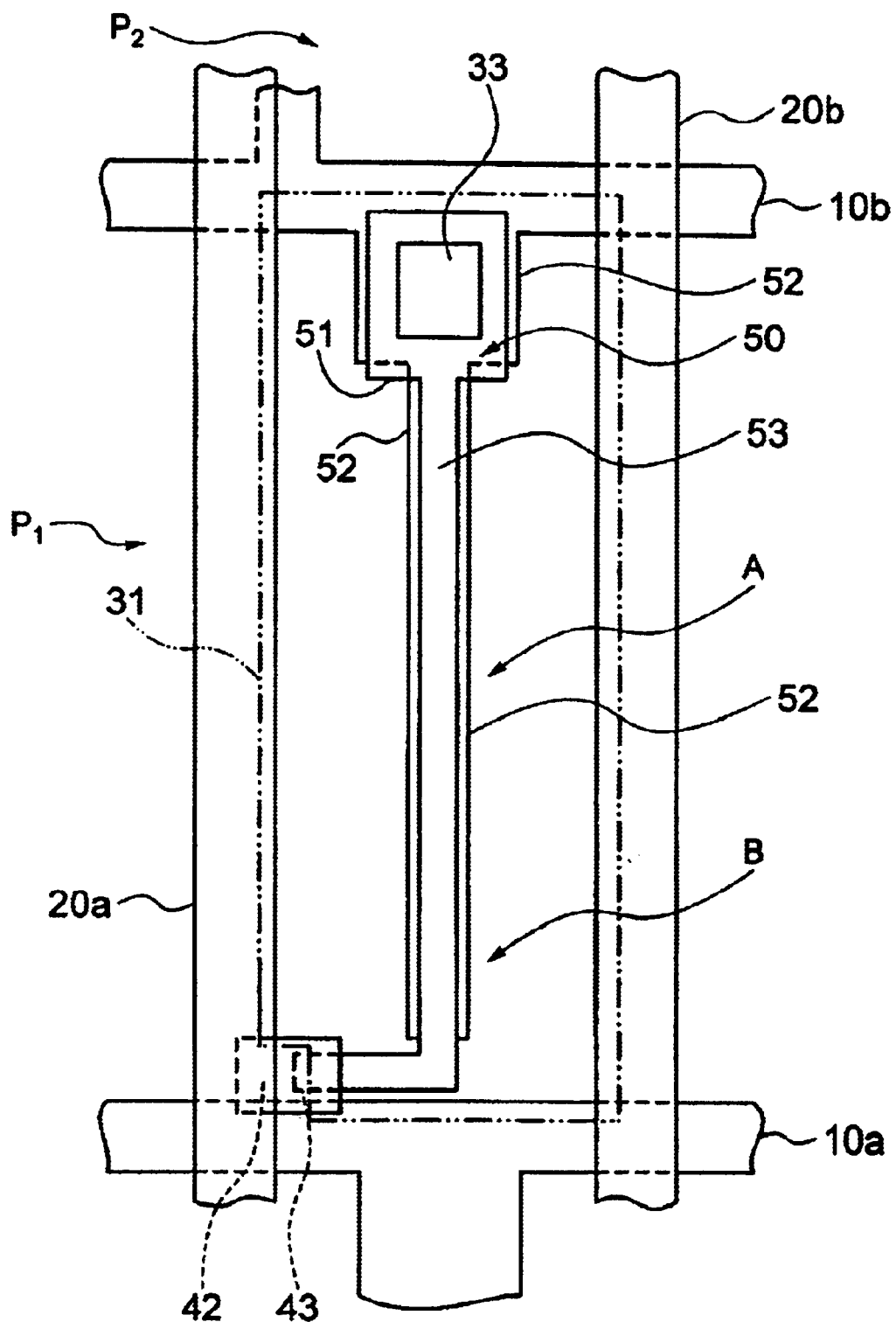
FIG. 17 is a plan view showing a single pixel region P1 on a TFT array substrate of the liquid crystal display according to a fifth embodiment of the present invention.

FIG. 17 is a plan view showing a single pixel region P1 on a TFT array substrate of the liquid crystal display according to a fifth embodiment of the present invention. In FIG. 17, a pixel electrode 31 is shown by double-dashed chain lines.

When the liquid crystal displays described in the first to fourth embodiments are applied to high-resolution liquid crystal displays having pixel regions of the order of 40 $\mu$m×120 $\mu$m in size, both liquid crystal capacity and storage capacity decrease to approximately ⅓–¼ because the pixel sizes are extremely smaller than those of conventional liquid crystal displays (100 $\mu$m×300 $\mu$m or so). This means a too low retention capacitance, which possibly causes poor display including lower contrast and flickering. Higher storage capacitance will effectively suppress this problem. To solve this problem, the liquid crystal display of the fifth embodiment shown in FIG. 17 is intended to increase storage capacitance even in high-resolution liquid crystal display applications. This liquid crystal display is identical to that of the first embodiment except in the configuration of the storage capacitance sections 50. Therefore, description will now be made mainly on the configuration of the storage capacitance section 50.

A pixel region P1 contains a storage capacitance section 50. This storage capacitance section 50 comprises a common electrode 52 and a storage capacitance electrode 51. The common electrode 52 is extended from an address line 10b of an adjacent pixel region P2 into the pixel region P1. The storage capacitance electrode 51 sandwiches a gate insulating film 2 with the common electrode 52 to store capacitance therebetween. This storage capacitance electrode 51 is formed with a source electrode 43 in a TFT section 40 via wiring 53 by using the same metal film. The storage capacitance electrode 51 is also connected to the pixel electrode 31 via a through hole 33 which pierces through an upper insulating film 5. The common electrode 52 is elongated parallel to the wiring 53 and the common electrode 52 not only overlaps the storage capacitance electrode 51 but also overlaps most parts of the wiring 53 for higher storage capacitance. The part of the common electrode 52 which overlaps on the wiring 53 has a width larger than that of the wiring 53.

The storage capacitance section 50 of the present embodiment has a higher storage capacitance than that of the storage capacitance section shown in FIG. 8.

Figure 18:
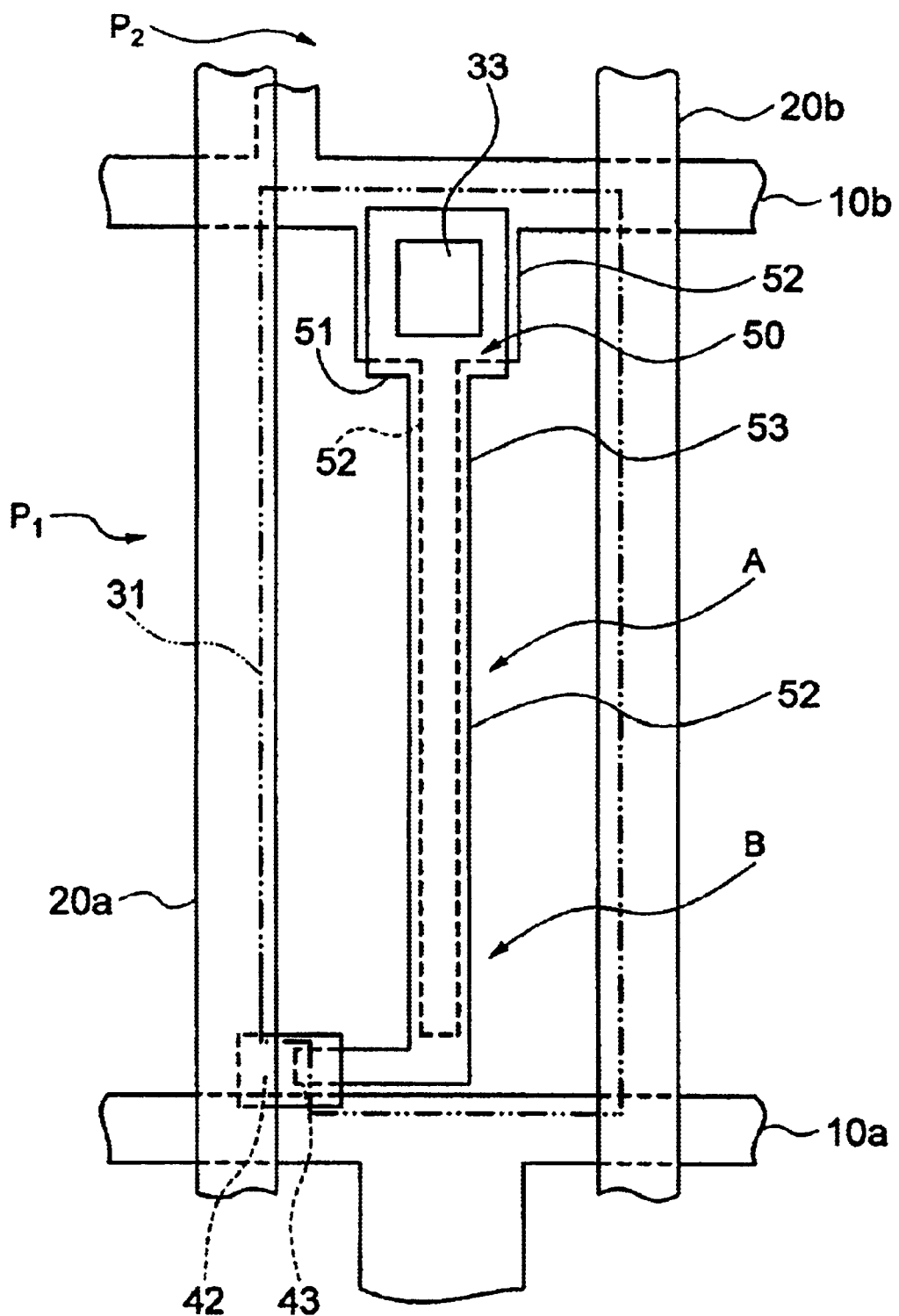
FIG. 18 is a plan view showing a single pixel region P1 on a TFT array substrate of the liquid crystal display according to an example of the fifth embodiment.

FIG. 18 is a plan view showing a single pixel region P1 on a TFT array substrate of the liquid crystal display according to an example of a fifth embodiment of the present invention. In this example, the width of a wiring 53 is larger than the width of a part of a common electrode 52 which overlaps said wiring 53. The storage capacitance section 50 of this example also has a higher storage capacitance than that of the storage capacitance section shown in FIG. 8.

Figure 19:
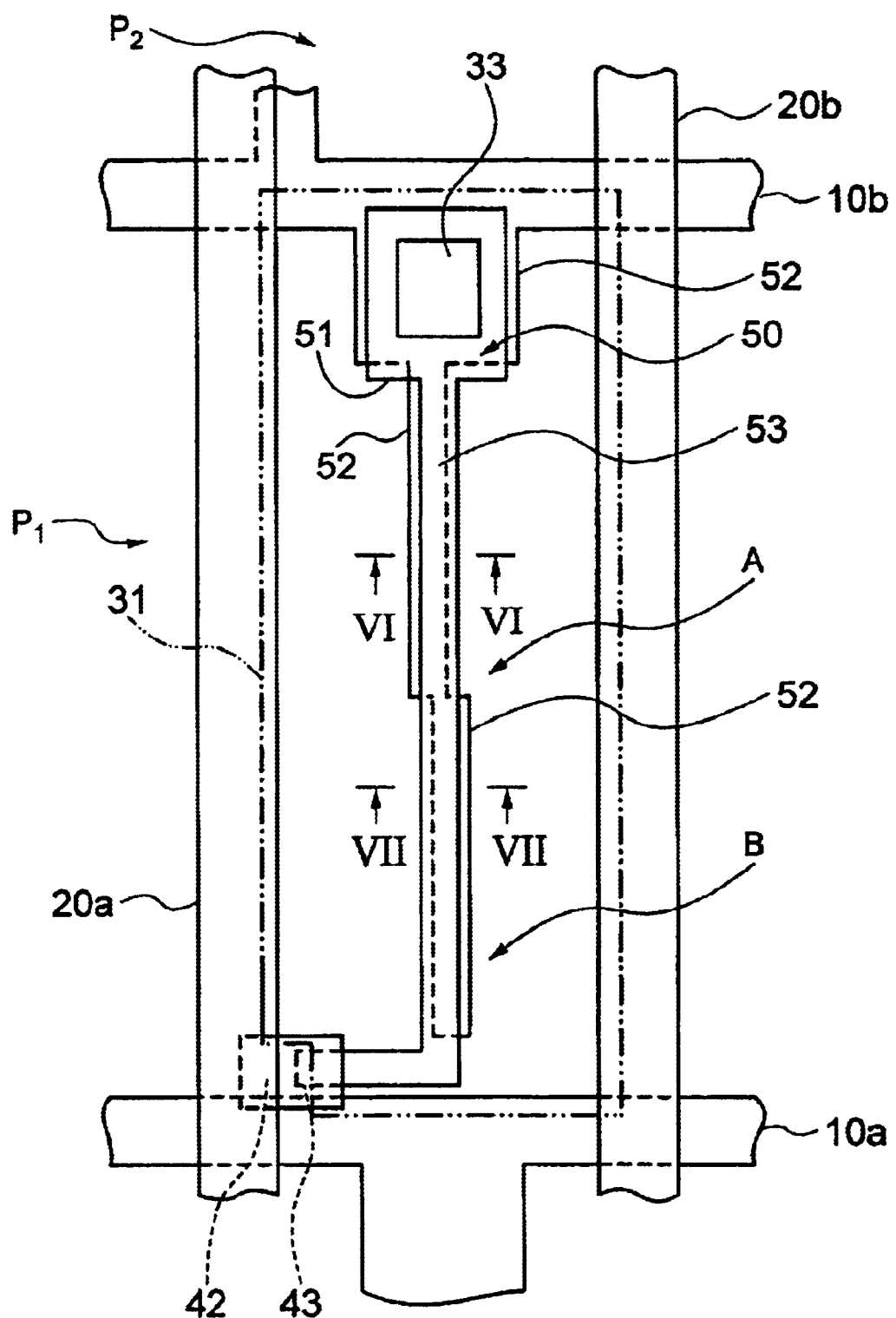
FIG. 19 is a plan view showing a single pixel region P1 on a TFT array substrate of the liquid crystal display according to another example of the fifth embodiment.
Figure 20:
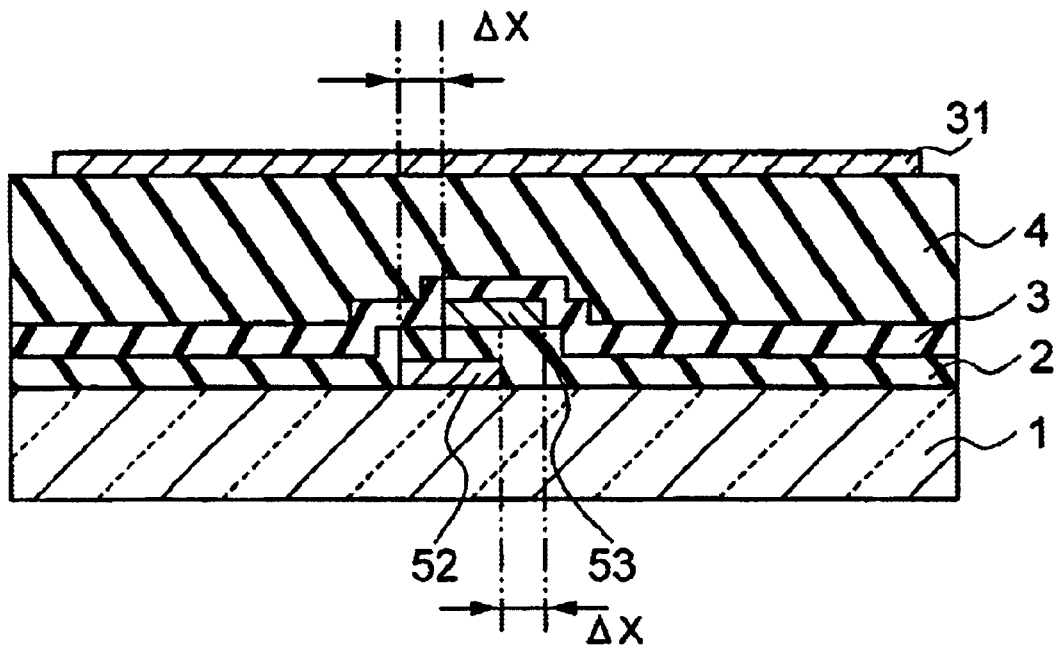
FIG. 20 is a sectional view taken along the line VI—VI of FIG. 19.
Figure 21:
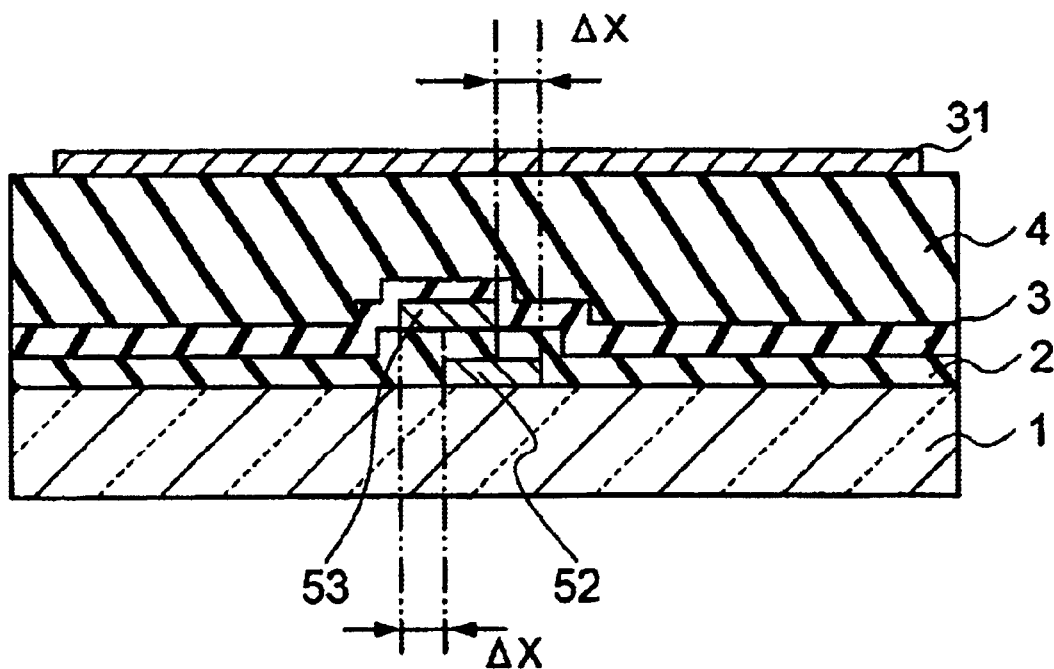
FIG. 21 is a sectional view taken along the line VII—VII of FIG. 19.

FIG. 19 is a plan view showing a single pixel region P1 on a TFT array substrate of the liquid crystal display according to another example of the fifth embodiment of the present invention. FIG. 20 is a sectional view taken along the line VI—VI of FIG. 19. FIG. 21 is a sectional view taken along the line VII—VII of FIG. 19.

The liquid crystal display of the example of the fifth embodiment shown in FIG. 19 is intended to increase storage capacitance without lowering the aperture ratio even in high-resolution liquid crystal display applications. This liquid crystal display is identical to that of the first embodiment except in the configuration of the storage capacitance sections 50. Therefore, description will now be made mainly on the configuration of the storage capacitance section 50.

A pixel region P1 contains a storage capacitance section 50. This storage capacitance section 50 comprises a common electrode 52 and a storage capacitance electrode 51. The common electrode 52 is extended from an address line 10b of an adjacent pixel region P2 into the pixel region P1. The storage capacitance electrode 51 sandwiches a gate insulating film 2 with the common electrode 52 to store capacitance therebetween. This storage capacitance electrode 51 is formed with a source electrode 43 in a TFT section 40 via wiring 53 by using the same metal film. The storage capacitance electrode 51 is also connected to the pixel electrode 31 via a through hole 33 which pierces through an upper insulating film 5. The common electrode 52 is elongated parallel to the wiring 53 and the common electrode 52 not only overlaps the storage capacitance electrode 51 but also overlaps most part of the wiring 53 for higher storage capacitance. The part of the common electrode 52 which overlaps on the wiring 53 has a same width as that of the wiring 53.

FIGS. 20 and 21 are sectional views of the overlapping portions of the common electrode 52 and the wiring 53 at the lines VI—VI and VII—VII of FIG. 19, respectively. In a half part A of the wiring 53, the common electrode 52 is displaced from the wiring 53 in a leftward direction by Δx μm. On the other hand, in a half part B of the wiring 53, the common electrode 52 is displaced from the wiring 53 in a right-ward direction by Δx μm.

The common electrode 52 and the wiring 53 are configured in a misaligned shape as described above in consideration of alignment offsets between the cannon electrode 52 and the wiring 53, caused in exposure systems. In the high-resolution liquid crystal displays mentioned above, storage capacitance occupies a major proportion of retention capacitance (the sum of storage capacitance and liquid crystal capacitance). Therefore, variations in the storage capacitance easily cause poor display including in-plane variations resulting from flickering.

In general, exposure systems have a 3σ alignment accuracy of the order of 1.5–2 μm, and therefore the common electrode 52 needs to be made greater than the wiring 53 by the amount Δx corresponding to the alignment accuracy. Here, the common electrode 52 may be widened by Δx at both lateral sides, which could increase a drop in aperture ratio though. Thus, the present embodiment adopts the above-described configuration of the common electrode 52 to suppress the drop in aperture ratio. Needless to say, the same configuration as that given to the common electrode 52 in the present embodiment can be applied to the wiring 53 to obtain the same effect.

while there has been described what are at present considered to be preferred embodiments of the invention, it will be understood that various modifications may be made thereto, and it is intended that the appended claims cover all such modifications as fall within the true spirit and scope of the invention.

What is claimed is:

1. A liquid crystal display, comprising:

an insulative substrate;

a plurality of address lines formed on the insulative substrate;

a gate insulating film formed over said address lines;

a plurality of data lines formed to cross said address lines with said gate insulating film between said address lines and said data lines;

an upper insulating film formed over said data lines;

a pixel electrode formed on said upper insulating film in each pixel region enclosed with said address lines and said data lines, wherein said pixel electrode comprises a transparent conductive film for applying a potential to liquid crystal in a respective pixel region;

a thin film transistor section arranged in each of said pixel regions, said thin film transistor section having a gate connected to said address line and a pair of electrodes, one of which is connected to said data line, and selectively establishing a connection between said electrode connected to said data line and other electrode under a signal applied to said gate;

a storage capacitance electrode arranged in each of said pixel regions, said storage capacitance electrode stores capacitance with a common electrode connected to said address line of an adjacent pixel region or with an auxiliary capacitance common wiring formed on said insulative substrate so as to pass through said respective pixel region;

a wiring connecting said storage capacitance electrode and said other electrode of said thin film transistor section; and a conductive through hole formed over said storage capacitance electrode and connecting said storage capacitance electrode and said pixel electrode; wherein said storage capacitance electrode and said other electrode of said thin film transistor section are connected to said pixel electrode through said wiring, said storage capacitance electrode and said conductive through hole, and are integrally formed of the same metal film, and wherein the connecting portions of said storage capacitance electrodes to said conductive through holes, and said address lines or said auxiliary capacitance common wiring are arranged so as not to overlap each other across said gate insulating film.

2. A liquid crystal display, comprising:

an insulative substrate;

a plurality of address lines formed on the insulative substrate;

a gate insulating film formed over said address lines;

a plurality of data lines formed to cross said address lines with said gate insulating film between said address lines and said data lines;

an upper insulating film formed over said data lines;

a pixel electrode formed on said upper insulating film in each pixel region enclosed with said address lines and said data lines, wherein said pixel electrode comprises a transparent conductive film for applying a potential to liquid crystal in a respective pixel region;

a thin film transistor section arranged in each of said pixel regions, said thin film transistor section having a gate connected to said address line and a pair of electrodes, one of which is connected to said data line, and selectively establishing a connection between said electrode connected to said data line and other electrode under a signal applied to said gate;

a storage capacitance electrode arranged in each of said pixel regions, said storage capacitance electrode stores capacitance with a common electrode connected to said address line of an adjacent pixel region or with an auxiliary capacitance common wiring formed on said insulative substrate so as to pass through said respective pixel region;

a wiring connecting said storage capacitance electrode and said other electrode of said thin film transistor section; and a conductive through hole formed over said storage capacitance electrode and connecting said storage capacitance electrode and said pixel electrode; wherein said storage capacitance electrode and said other electrode of said thin film transistor section are connected to said pixel electrode through said wiring, said storage capacitance electrode and said conductive through hole, and are integrally formed of the same metal film, and wherein etch protective layers are arranged between said gate insulating film and the connecting portions of said storage capacitance electrodes under said conductive through holes.

3. The liquid crystal display according to claim 2, wherein said etch protective layers each are formed of an amorphous silicon film.

4. A liquid crystal display comprising:
an insulative substrate;
a plurality of address lines formed on the insulative substrate;
a gate insulating film formed over said address lines;
a plurality of data lines formed to cross said address lines with said gate insulating film between said address lines and said data lines;
an upper insulating film formed over said data lines;
a pixel electrode formed on said upper insulating film in each pixel region enclosed with said address lines and said data lines, wherein said pixel electrode comprises a transparent conductive film for applying a potential to liquid crystal in a respective pixel region;
a thin film transistor section arranged in each of said pixel regions, said thin film transistor section having a gate connected to said address line and a pair of electrodes, one of which is connected to said data line, and selectively establishing a connection between said electrode connected to said data line and other electrode under a signal applied to said gate;
a storage capacitance electrode arranged in each of said pixel regions, said storage capacitance electrode stores capacitance with a common electrode connected to said address line of an adjacent pixel region or with an auxiliary capacitance common wiring formed on said insulative substrate so as to pass through said respective pixel region;

a wiring connecting said storage capacitance electrode and said other electrode of said thin film transistor section; and a conductive through hole formed over said storage capacitance electrode and connecting said storage capacitance electrode and said pixel electrode; wherein said storage capacitance electrode and said other electrode of said thin film transistor section are connected to said pixel electrode through said wiring, said storage capacitance electrode and said conductive through hole, and are integrally formed of the same metal film, and said data lines are shaped like a band of constant width; and said electrodes of said thin film transistors, coupled to said data lines are formed to be included inside said band-shaped data lines.

5. A method of fabricating a liquid crystal display, comprising:
forming a plurality of address lines on an insulative substrate, and gates extended from said address lines in respective pixel regions;

forming a gate insulating film over said address lines and said gates;

forming, on said gate insulating film, in a single patterning, an active layer having source/drain electrodes, and a plurality of data lines crossing said address lines to make said pixel regions, in thin film transistor sections of said respective pixel regions, electrodes extend from said data lines and electrodes connect to pixel electrodes, and storage capacitance electrodes integrally extend from said electrodes to said pixel electrodes and are formed by using the same metal films, said storage capacitance electrodes store capacitance for retaining a potential on said pixel electrode with said address lines of adjacent pixel regions;

forming an upper insulating film over said data lines, said electrodes, and said storage capacitance electrodes;

forming through holes in said upper insulating film so as to reach said storage capacitance electrodes; and forming said pixel electrodes on said upper insulating film as well as establishing a connection between said pixel electrodes and said storage capacitance electrodes via said through holes, wherein etch protective layers are formed between said gate insulating film and said storage capacitance electrodes at the same time as the active layer and the source/drain electrodes.

6. The method of fabricating a liquid crystal display according to claim 5, wherein said etch protective layers are formed by using an amorphous silicon film while channel layers and contact layers each consisting of an amorphous silicon film are formed in said thin film transistor sections on said gate insulating film.

7. A method of fabricating a liquid crystal display, comprising:
forming a plurality of address lines on an insulative substrate, along with gates extended from said address lines and auxiliary capacitance common wiring in respective pixel regions;

forming a gate insulating film over said address lines, said gates, and said auxiliary capacitance common wiring;

forming, on said gate insulating film, in a single patterning, an active layer having source/drain electrodes, and a plurality of data lines crossing said address lines to make said pixel regions, in thin film transistor sections of said respective pixel regions, electrodes extend from said data lines and connect to pixel electrodes, and storage capacitance electrodes integrally extend from said electrodes to said pixel electrodes and are formed by using the same metal films, said storage capacitance electrodes store capacitance for retaining a potential on said pixel electrode with said auxiliary capacitance common wiring;

forming an upper insulating film over said data lines, said electrodes, and said storage capacitance electrodes;

forming through holes in said upper insulating film so as to reach said storage capacitance electrodes; and forming said pixel electrodes on said upper insulating film as well as establishing a connection between said pixel electrodes and said storage capacitance electrodes via said through holes, wherein etch protective layers are formed between said gate insulating film and said storage capacitance electrodes at the same time as the active layer and the source/drain electrodes.

8. The method of fabricating a liquid crystal display according to claim 7, wherein said etch protective layers are formed by using an amorphous silicon film while channel layers and contact layers each consisting of an amorphous silicon film are formed in said thin film transistor sections on said gate insulating film.

9. A liquid crystal display, comprising:

an insulative substrate;

a plurality of address lines formed on the insulative substrate;

a gate insulating film formed over said address lines;

a plurality of data lines formed to cross said address lines with said gate insulating film between said address lines and said data lines;

an upper insulating film formed over said data lines;

a pixel electrode formed on said upper insulating film in each pixel region enclosed with said address lines and said data lines, wherein said pixel electrode comprises a transparent conductive film for applying a potential to liquid crystal in a respective pixel region;

a thin film transistor section arranged in each of said pixel regions, said thin film transistor section having a gate connected to said address line and a pair of electrodes, one of which is connected to said data line, and selectively establishing a connection between said electrode connected to said data line and other electrode under a signal applied to said gate;

a storage capacitance electrode arranged in each of said pixel regions, said storage capacitance electrode stores capacitance with a common electrode connected to said address line of an adjacent pixel region or with an auxiliary capacitance common wiring formed on said insulative substrate so as to pass through said respective pixel region;

a wiring connecting said storage capacitance electrode and said other electrode of said thin film transistor section; and a conductive through hole formed over said storage capacitance electrode and connecting said storage capacitance electrode and said pixel electrode; wherein said storage capacitance electrode and said other electrode of said thin film transistor section are connected to said pixel electrode through said wiring, said storage capacitance electrode and said conductive through hole, and said address lines or said auxiliary capacitance common wiring are arranged so as not to overlap each other across said gate insulating film.

10. A liquid crystal display, comprising:

an insulative substrate;

a plurality of address lines formed on the insulative substrate;

a gate insulating film formed over said address lines;

a plurality of data lines formed to cross said address lines with said gate insulating film between said address lines and said data lines;

an upper insulating film formed over said data lines;

a pixel electrode formed on said upper insulating film in each pixel region enclosed with said address lines and said data lines, wherein said pixel electrode comprises a transparent conductive film for applying a potential to liquid crystal in a respective pixel region;

a thin film transistor section arranged in each of said pixel regions, said thin film transistor section having a gate connected to said address line and a pair of electrodes, one of which is connected to said data line, and selectively establishing a connection between said electrode connected to said data line and other electrode under a signal applied to said gate;

a storage capacitance electrode arranged in each of said pixel regions, said storage capacitance electrode stores capacitance with a common electrode connected to said address line of an adjacent pixel region or with an auxiliary capacitance common wiring formed on said insulative substrate so as to pass through said respective pixel region;

a wiring connecting said storage capacitance electrode and said other electrode of said thin film transistor section; and a conductive through hole formed over said storage capacitance electrode and connecting said storage capacitance electrode and said pixel electrode; wherein said storage capacitance electrode and said other electrode of said thin film transistor section are connected to said pixel electrode through said wiring, said storage capacitance electrode and said conductive through hole.

11. The liquid crystal display according to claim 10, wherein said etch protective layers each are formed of an amorphous silicon film.

12. A liquid crystal display comprising:

an insulative substrate;

a plurality of address lines formed on the insulative substrate;

a gate insulating film formed over said address lines;

a plurality of data lines formed to cross said address lines with said gate insulating film between said address lines and said data lines;

an upper insulating film formed over said data lines;

a pixel electrode formed on said upper insulating film in each pixel region enclosed with said address lines and said data lines, wherein said pixel electrode comprises a transparent conductive film for applying a potential to liquid crystal in a respective pixel region;

a thin film transistor section arranged in each of said pixel regions, said thin film transistor section having a gate connected to said address line and a pair of electrodes, one of which is connected to said data line, and selectively establishing a connection between said electrode connected to said data line and other electrode under a signal applied to said gate;

a storage capacitance electrode arranged in each of said pixel regions, said storage capacitance electrode stores capacitance with a common electrode connected to said address line of an adjacent pixel region or with an auxiliary capacitance common wiring formed on said insulative substrate so as to pass through said respective pixel region;

a wiring connecting said storage capacitance electrode and said other electrode of said thin film transistor section; and a conductive through hole formed over said storage capacitance electrode and connecting said storage capacitance electrode and said pixel electrode; wherein said storage capacitance electrode and said other electrode of said thin film transistor section are connected to said pixel electrode through said wiring, said storage capacitance electrode and said conductive through hole, and said data lines are shaped like a band of constant width; and said electrodes of said thin film transistors, coupled to said data lines are formed to be included inside said band-shaped data lines.

* * * * *